US010889715B2

(12) United States Patent
Leibler et al.

(10) Patent No.: US 10,889,715 B2
(45) Date of Patent: Jan. 12, 2021

(54) POLYMER COMPOSITION COMPRISING CROSSLINKED SILICONES WITH EXCHANGEABLE CROSSLINKING POINTS, PREPARATION METHOD AND USES

(71) Applicants: ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE (CNRS), Paris (FR)

(72) Inventors: Ludwik Leibler, Paris (FR); Renaud Nicolay, Verrieres-le-Buisson (FR); Corinne Soulie-Ziakovic, Paris (FR)

(73) Assignees: ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 22 days.

(21) Appl. No.: 16/093,313

(22) PCT Filed: Apr. 18, 2017

(86) PCT No.: PCT/FR2017/050912
§ 371 (c)(1),
(2) Date: Oct. 12, 2018

(87) PCT Pub. No.: WO2017/178775
PCT Pub. Date: Oct. 19, 2017

(65) Prior Publication Data
US 2019/0127583 A1 May 2, 2019

(30) Foreign Application Priority Data

Apr. 15, 2016 (FR) ...................... 16 53350

(51) Int. Cl.
C08L 83/08 (2006.01)
C08K 5/07 (2006.01)
C08L 83/06 (2006.01)
C08G 77/38 (2006.01)
C08G 77/382 (2006.01)
C08L 83/00 (2006.01)
C08G 77/388 (2006.01)
C08G 77/14 (2006.01)
C08G 77/26 (2006.01)
C08K 5/16 (2006.01)
C08K 5/18 (2006.01)
C08J 3/24 (2006.01)
C08K 5/17 (2006.01)
C08K 5/29 (2006.01)

(52) U.S. Cl.
CPC .............. C08L 83/08 (2013.01); C08G 77/14 (2013.01); C08G 77/26 (2013.01); C08G 77/38 (2013.01); C08G 77/382 (2013.01);

C08G 77/388 (2013.01); C08J 3/24 (2013.01); C08K 5/07 (2013.01); C08K 5/16 (2013.01); C08K 5/17 (2013.01); C08K 5/18 (2013.01); C08K 5/29 (2013.01); C08L 83/00 (2013.01); C08L 83/06 (2013.01); C08J 2383/06 (2013.01); C08J 2383/08 (2013.01); C08L 2312/00 (2013.01)

(58) Field of Classification Search
CPC ......... C08L 83/08; C08L 83/06; C08G 77/26; C08K 5/17; C08K 5/07; C08K 5/29
See application file for complete search history.

(56) References Cited

U.S. PATENT DOCUMENTS 2,529,186 A * 11/1950 Richmond .............. C07C 45/74
568/433
2,942,019 A * 6/1960 Pike ...................... C07F 7/0889
556/413
4,948,858 A 8/1990 Barthelemy
2012/0302705 A1 11/2012 Kodate et al.

FOREIGN PATENT DOCUMENTS

WO WO 2013/056467 A2 4/2013

OTHER PUBLICATIONS

Bae et al., "Regiospecific Side-Chain Functionalization of Linear Low-Density Polyethylene with Polar Groups," Polymer Chemistry, Agnew. Chem. Int. Ed., vol. 44, 2005, pp. 6410-6413.
Belfield et al., "Hydrosilylation of (4-Unsaturated Esters: Application for the Synthesis of Functional Polysiloxane Graft Copolymers and Macromonomers," Journal of Polymer Science: Part A: Polymer Chemistry, vol. 29, 1991, pp. 1073-1076.
Bruno et al., "Use of Niobium (III) and Niobium (V) Compounds in Catalytic Imine Metathesis under Mild Conditions," Organometallics, vol. 19, 2000 (published on web Oct. 14, 2000), pp. 4672-4674.
Cantrell et al., "Catalytic C=N Bond Formation by Metal-Imide-Mediated Imine Metathesis," J. Am. Chem. Soc., vol. 120, 1998 (published on web Jul. 30, 1998), pp. 8035-8042.
Cantrell et al., "Transition-Metal-Catalyzed Imine Metathesis," Organometallics, vol. 16, No. 25, Dec. 9, 1997, pp. 5381-5383.

(Continued)

Primary Examiner — Kuo Liang Peng
(74) Attorney, Agent, or Firm — Birch, Stewart, Kolasch & Birch, LLP

(57) ABSTRACT

The invention relates to a silicone composition comprising (a) crosslinked polymers comprising consecutive —Si—O— units containing exchangeable pendant bonds and exchangeable crosslinking points, that are exchangeable by aldehyde-imine exchange reactions and/or by imine-imine exchange reactions and/or by imine-primary amine exchange reactions, obtained by crosslinking linear or branched polymers comprising consecutive —Si—O— units and (b) monofunctional free aldehydes and/or monofunctional free imines and/or monofunctional free primary amines.

24 Claims, 1 Drawing Sheet

(56) References Cited

OTHER PUBLICATIONS

Chung, "Synthesis of functional polyolefin copolymers with graft and block structures," Prog. Polym. Sci., vol. 27, 2002, pp. 39-85.
Crivello et al., "Chemoselective Hydrosilations. I. Synthesis and Photopolymerization of 1-Propenyl Ether Functionalized Siloxanes," Journal of Polymer Science: Part A: Polymer Chemistry, vol. 33, 1995, pp. 2415-2423.
Crivello et al., "Novel Platinum-Containing Initiators for Ring-Opening Polymerizations," Journal of Polymer Science: Part A: Polymer Chemistry, vol. 29, 1991, pp. 1853-1863.
Crivello et al., "Preparation of 1-Propenyl Ether Functional Siloxanes by Chemoselective Hydrosilation and Their Cationic Photopolymerization," Macromolecules, vol. 28, 1995 (abstract published in advance on Nov. 1, 1995), pp. 8057-8064.
Crivello et al., "Regioselective Hydrosilations. IV. The Synthesis and Polymerization of Monomers Containing Epoxy and Alkoxysilane Groups," Journal of Polymer Science: Part A: Polymer Chemistry, vol. 31, 1993, pp. 3121-3132.
Crivello et al., "The Synthesis, Characterization, and Photoinitiated Cationic Polymerization of Silicon-Containing Epoxy Resins," Journal of Polymer Science: Part A: Polymer Chemistry, vol. 28, 1990, pp. 479-503.
French Preliminary Search Report for French Application No. 1653350, dated Dec. 12, 2016.
Gilbert et al., "Transient Catalysts for the Polymerization of Organosiloxanes," Journal of Polymer Science, vol. 40, 1959, pp. 35-58.
Giuseppone et al., "Scandium(III) Catalysis of Transimination Reactions. Independent and Constitutionally Coupled Reversible Processes," J. Am. Chem. Soc., vol. 127, 2005 (published on web Mar. 22, 2005), pp. 5528-5539.
Günay et al., "Standing on the Shoulders of Hermann Staudinger: Post-polymerization Modification from Past to Present," Journal of Polymer Science Part A: Polymer Chemistry, vol. 51, 2013 (published online Oct. 29, 2012), pp. 1-28.
Hoyle et al., "Thiol-click chemistry: a multifaceted toolbox for small molecule and polymer synthesis," Chem. Soc. Rev., vol. 39, 2010 (Published online Feb. 9, 2010), pp. 1355-1387 (34 pages total).
Hoyle et al., "Thiol-Ene Click Chemistry," Polymer Chemistry, Agnew. Chem. Int. Ed., vol. 49, 2010, pp. 1540-1573.
International Search Report and Written Opinion of the International Searching Authority for International Application No. PCT/FR2017/050912, dated Aug. 1, 2017.
Lecamp et al., "Polydiméthyl Siloxane Photoréticulable par Voie Cationique—I. Synthèse et Photoréticulation de Polydiméthyl Siloxane a Greffons Epoxy Norbornène," Eur. Polym. J., vol. 33, No. 9, 1997, pp. 1453-1462.
Lewis, "On the Mechanism of Metal Colloid Catalyzed Hydrosilylation: Proposed Explanations for Electronic Effects and Oxygen Cocatalysis," J. Am. Chem. Soc., vol. 112, 1990, pp. 5998-6004.
Liu et al., "Self-healing polymers based on thermally reversible Diels-Alder chemistry," Polymer Chemistry, vol. 4, 2013 (Published on Dec. 11, 2012), 2194-2205.
Mather et al., "Michael addition reactions in macromolecular design for emerging technologies," Prog. Polym., vol. 31, 2006, pp. 487-531.
McInnes et al., "Transition metal imide/organic imine metathesis reactions: unexpected observations," Chem. Commun., Jan. 1998, pp. 1669-1670.
Meyer et al., "Zirconium-Mediated !mine Metathesis. Synthesis of 2,4-Diaza-1-zirconiacyclobutanes and the Mechanism of Their Reactions with Imines and Alkynes," J. Am. Chem. Soc., vol. 116, 1994, pp. 2669-2670.
Moad, "The synthesis of polyolefin graft copolymers by reactive extrusion," Prog. Polym. Sci., vol. 24, 1999, pp. 81-142.
Nicolas et al., "Nitroxide-mediated polymerization," Progress in Polymer Science, vol. 38, 2013 (available online Jun. 28, 2012), pp. 63-235.
Passaglia et al., "Control of macromolecular architecture during the reactive functionalization in the melt of olefin polymers," Progress in Polymer Science, vol. 34, 2009 (available online Jun. 6, 2009), pp. 911-947.
Puyenbroek et al., "Synthesis of siloxanes containing acid-sensitive side groups," Polymer, vol. 37, No. 5, 1996, pp. 847-854.
Racles et al., "On the feasibility of chemical reactions in the presence of siloxane-based surfactants," Colloid Polym Sci, vol. 287, 2009 (available online Jan. 23, 2009), pp. 461-470.
Spinu et al., "Synthesis of Poly(Dimethylsiloxane) Oligomers with Pendant Amine Groups via Co-Equilibration Anionic Polymerization Reactions," Journal of Polymer Science: Part A: Polymer Chemistry, vol. 29, 1991, pp. 657-670.
Tasdelen, "Diels-Alder "click" reactions: recent applications in polymer and material science," Polymer Chemistry, vol. 2, May 27, 2011, pp. 2133-2145.
Wang et al., "Metathesis Reactions of Tris(adamantylimido)methylrhenium and Aldehydes and Imines," vol. 18, 1999 (published on web Nov. 22, 1999), pp. 5170-5175.
Zuckerman et al., "Zirconium-Mediated Metathesis of Imines: A Study of the Scope, Longevity, and Mechanism of a Complicated Catalytic System," Journal of the American Chemical Society, vol. 122, No. 5, Feb. 9, 2000 (published on web Jan. 25, 2000), pp. 751-761.

* cited by examiner

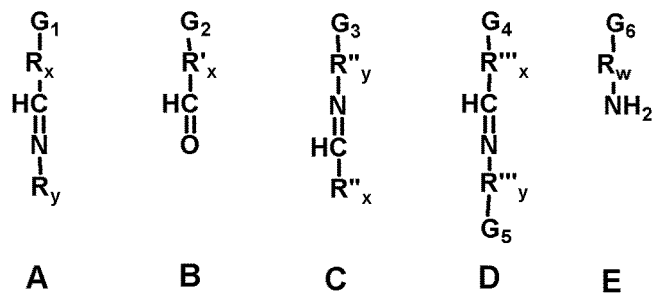
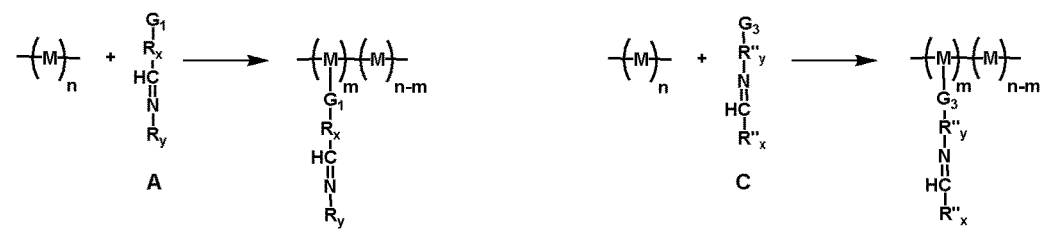
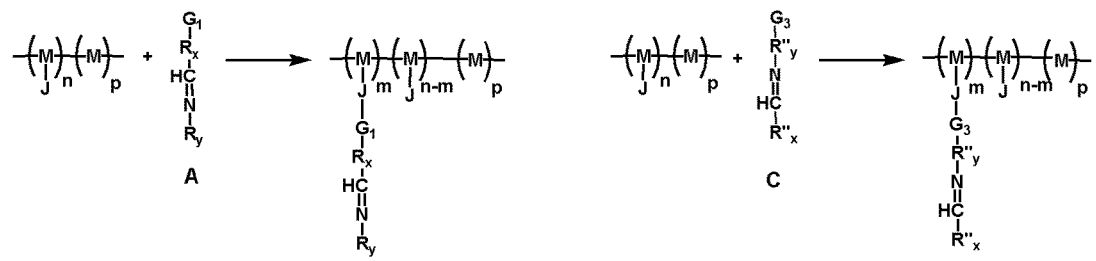
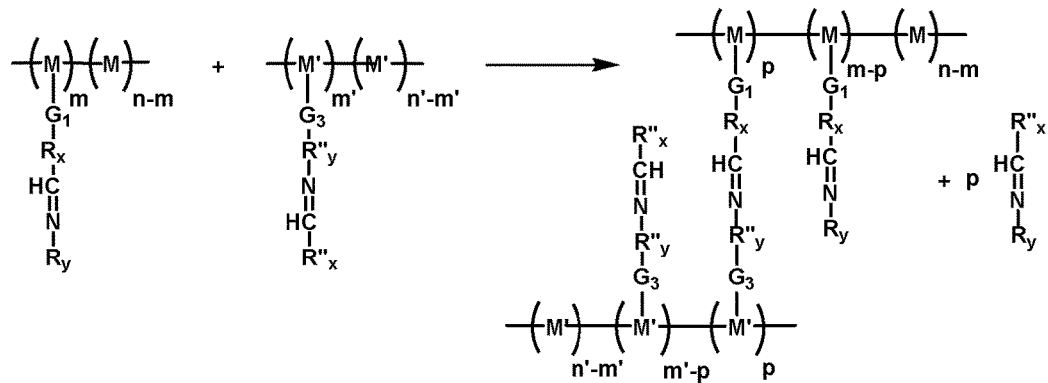
Fig. 3

POLYMER COMPOSITION COMPRISING CROSSLINKED SILICONES WITH EXCHANGEABLE CROSSLINKING POINTS, PREPARATION METHOD AND USES

The invention relates to polymer compositions comprising crosslinked silicones comprising imine functions, and optionally aldehyde functions, optionally primary amine functions, enabling exchange reactions, and monofunctional free aldehydes and/or monofunctional free imines and/or monofunctional primary amines.

According to the invention, these compositions are advantageously derived from the modification of a polymer comprising consecutive silicone units by a functionalised imine and/or aldehyde and/or primary amine additive. This silicone polymer may be imine and/or aldehyde and/or primary amine pre-functionalised, depending on the case, or functionalised during the addition of said additive.

In particular, the invention targets a method making it possible to modify the behaviour of a polymer comprising consecutive silicone units by addition of a functional additive making it possible to form a crosslinked network containing exchangeable imine-imine and/or imine-aldehyde and/or imine-primary amine bonds.

Polymers comprising consecutive silicone units, that is to say consecutive —Si—O— units, will also be designated "silicones".

Silicones or poly(dialkyl siloxane)s exhibit a combination of physical, chemical and mechanical properties that are unique on account of the nature of the covalent chemical bonds constituting their backbone, namely Si—O bonds.

Among these properties may be cited great chemical inertia, good resistance to ultraviolet radiation, to oxygen, to ozone, hydrophobic properties and low permeability to water, low toxicity, high degradation temperature, low thermal conductivity, low dependence of the physical-chemical properties over a very wide temperature range, very low glass transition temperature, great permeability to gases and notably to oxygen.

These characteristics impart superior properties to silicones and explain their use in very many fields. The building industry is the most developed application sector by volume at the present time. They are used in said industry to design mastics, fillers and especially joints. Silicone rubbers are also widely used in the transport sector, for automobiles and in aeronautics. Silicones are also used to prepare coatings, notably in the textile and aeronautics fields. Silicone based adhesives, and more particularly "pressure sensitive" adhesives or "sensitive skin" adhesives, are commonly used in the health and cosmetics sectors. Silicone elastomers are also widely used for designing kitchen utensils and moulds for fields as varied as art, the medical field (dental impressions for example), or the food-processing field (cake moulds, ice moulds, etc.). Silicone elastomers also serve in the electronics industry (for example connector technology) and in cable technology for designing heat insulating materials, but also to provide mechanical and chemical protection.

In the very great majority of these applications, the silicones are used in the form of elastomers, that is to say in the form of networks of chemically crosslinked polymers. Chemical crosslinking, also called vulcanisation, is essential for providing dimensional stability to the objects and to the materials, and notably to prevent them from flowing. Crosslinking also makes it possible to improve the mechanical properties (elasticity notably) and the chemical resistance of silicone elastomers.

The crosslinking of silicones is thus very important from an applicative viewpoint. Hence, silicone elastomers are commonly classified according to the vulcanisation method employed to prepare them. It is thereby possible to distinguish two large families, cold crosslinked silicone elastomers and hot crosslinked silicon elastomers.

In the case of cold crosslinked silicone elastomers (or RTV, for Room Temperature Vulcanization silicones), the crosslinking reaction is a condensation reaction triggered by the humidity in the air (in the case of single-component systems) or catalysed by tin or titanium salts (in the case of two-component systems). In both cases, the reaction is not very temperature sensitive and it is thus pointless to carry out the crosslinking reaction at a temperature above 40-50° C.

The condensation reaction may take place between hydroxy (silanol), alkoxy or acetoxy groups, leading respectively to the release of water, alcohol or acetic acid. These crosslinking reactions are very slow and take around one day, even in the presence of tin or titanium catalyst. Furthermore, the use of tin salts generates problems of toxicity for various applications.

The hot crosslinking of silicone elastomers requires the use of a thermal initiator, typically peroxides. During their decomposition, the thermal initiators are going to create carbon radicals on the pendant alkyl groups of the siloxane chains which will lead to the crosslinking of the material by recombination reaction. In certain cases, the polymer chains may contain a low percentage of vinyl groups (<1%), which facilitates the crosslinking. The crosslinking reaction is typically carried out at temperatures above 110° C. in several minutes. However, a step of post-curing for several hours at higher temperature (150-200° C.) is generally necessary in order to improve the level of crosslinking and the final properties of the elastomers.

A third method for crosslinking silicones exists, which lies between cold crosslinking and hot crosslinking, in the sense that this crosslinking method may be conducted at room temperature or hot. This third method is based on hydrosilylation reactions between silane (Si—H) groups and terminal alkene groups present in the poly(dialkyl siloxane)s to crosslink. This reaction requires the use of platinum (Pt) (or sometimes rhodium) catalysts and may be carried out at room temperature over twenty or so hours or in around one hour at temperatures of the order of 150-160° C. Despite its drawbacks, among which may be cited the use of toxic and costly catalysts, the chemical sensitivity of the catalysts vis à vis a large number of functional groups, the latter crosslinking method is a method of choice for preparing silicone elastomers at the industrial scale.

The synthesis of silicone elastomers can also be done by polymerisation by opening of cyclosiloxanes and biscyclosiloxanes (Gilbert, A. R.; Kantor, S. W. J. Polym. Sci. 1959, 40, 35-58). The speed and the temperature of crosslinking according to this method depend on the base used to generate the active silanolate species (Si—O$^-$) enabling the opening of the cyclosiloxanes. Using this method, it is possible to prepare silicone elastomers while working at temperatures close to 100° C. However, this method requires the synthesis of biscyclosiloxane compounds which are not commercially available. Moreover, these systems are characterised by an equilibrium between polymer chains and cyclosiloxane monomers. Thus, these systems always contain a non-negligible percentage (typically of the order of 15%) of cyclosiloxane monomers, such as octamethylcyclotetrasiloxane and decamethylcyclopentasiloxane. The elastomers thereby synthesised are thus going to see their properties change over time due to the de-polymerisation reaction. This phenomenon will be all the more pronounced at high temperatures, which greatly limits the potential applications of the silicone elastomers thereby prepared. Furthermore, octamethylcyclotetrasiloxane is a flammable liquid (flash point comprised between 51 and 57° C. in closed cup) of which the vapours can form explosive mixtures with air. The octamethylcyclotetrasiloxane monomer also presents a possible risk of impaired fertility (R62) and is labelled as harmful (Xn) by the European Community (toxicological file 271 of octamethylcyclotetrasiloxane established by INRS (French National Research and Safety Institute for the Prevention of Occupational Accidents)).

Thus, although several industrial methods exist for crosslinking silicone elastomers, all have drawbacks that complicate or limit the methods for preparing and implementing silicone elastomers and the application fields.

It is thus important to develop a method for crosslinking elastomers that makes it possible to prepare these materials without having to use toxic and costly catalysts, which can operate at room temperature or at relatively low temperatures, while operating in several hours or less.

In order to develop a method for crosslinking silicone elastomers not having the drawbacks and limitations of the systems described above, the Applicant has developed compositions of crosslinked silicones comprising imine functions, optionally aldehyde functions, optionally primary amine functions, enabling exchange reactions.

According to the invention, the metathesis reaction of imines enables an exchange reaction between the substituents borne by the imines:

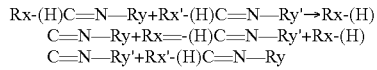

According to the invention, the imine-aldehyde exchange reaction enables an exchange between the substituents borne by the imines and the aldehydes:

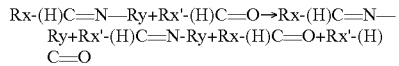

According to the invention, the imine-primary amine exchange reaction enables an exchange between the substituents borne by imines and primary amines:

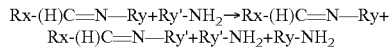

"Exchange reaction" is taken to mean that organic molecules, oligomers, polymers or polymer networks containing imine and/or aldehyde and/or primary amine functions can exchange their substituents by metathesis reaction of imines or by imine-aldehyde exchange reaction or by imine-primary amine exchange reaction. These substituents may be hydrocarbon groups, oligomer chains or polymer chains. These groups are bound to the imine, aldehyde and primary amine functions by covalent bonds via a carbon atom before and after the exchange reaction. The metathesis reaction of imines and imine-aldehyde and imine-primary amine exchange reactions do not release water molecules and do not require the presence of water to take place. Notably, "exchange reaction" is taken to mean that the polymers of the invention can exchange with each other the substituents of the imine and/or aldehyde and/or primary amine functions that they bear by metathesis reaction of imines or by imine-aldehyde exchange reaction or by imine-primary amine exchange reaction. According to the invention, these functions may be pendant or form part of the chain polymer, notably when they form part of a crosslinking point; the polymer chain furthermore comprising consecutive silicone units. Advantageously these functions are pendant or form part of a crosslinking point. Thus, the polymers are capable of exchanging chemical links with each other.

The metathesis reaction can take place in the absence of catalyst or in the presence of a new catalyst for the metathesis reaction of imines, which is stable, easily available, inexpensive and non-toxic.

Various transition metals, e.g. Zr (R. G. Bergman and col., J. Am. Chem. Soc., 1994, 116, 2669.; R. G. Bergman and col., J. Am. Chem. Soc., 2000, 122, 751), Mo (T. Y. Meyer and col., Organometallics, 1997, 16, 5381; T. Y. Meyer and col., J. Am. Chem. Soc. 1998, 120, 8035), Ti (P. Mountford and col., Chem. Commun., 1998, 1669), Re (J. H. Espenson and col., Organometallics 1999, 18, 5170), Nb (J. W. Bruno and col., Organometallics 2000, 19, 4672) and lanthanide salts (Sc, Tb, Sm, La) (J.-M. Lehn, J. Am. Chem. Soc., 2005, 127, 5528) with triflate ions have been studied for catalysing the metathesis of imines. However, in addition to being generally toxic and costly, these catalysts require several synthesis steps to be obtained. The development of non-toxic organic catalysts, easily available and inexpensive is thus particularly interesting.

Accordingly, the inventors have developed compositions of crosslinked polymers, in which the crosslinking reactions and the exchange reactions may take place in the absence of catalyst or in the presence of novel catalysts for the metathesis of imines: aldehydes.

Surprisingly, aldehyde-imine exchange reactions may also take place. These exchange reactions enable exchangeable silicones to be obtained.

Moreover, imine-primary amine exchange reactions may also take place. These exchange reactions also enable exchangeable silicones to be obtained.

Exchangeable silicones are taken to mean silicones that are able to exchange chemical links, hydrocarbon groups, oligomer chains or silicone chains by metathesis reaction of imines or by imine-aldehyde exchange reaction or by imine-primary amine exchange reaction.

Thus, the aim of the invention is to propose compositions of silicones, which may be prepared by mixing, with a silicone, one or more additive(s) making it possible to form a composition of crosslinked polymers, advantageously a crosslinked network, containing exchangeable pendant bonds and exchangeable crosslinking points that are exchangeable by aldehyde-imine and/or imine-imine and/or imine-primary amine exchange reactions. The silicone may be imine and/or aldehyde and/or primary amine functionalised before the addition of said additive or the addition of said additive can enable the imine and/or aldehyde and/or primary amine functionalisation of the silicone and crosslinking.

Furthermore, the aim of the invention is a method for modifying the behaviour, for example the rheology, of a silicone by addition to the composition comprising such a silicone of one or more additive(s). This(these) additive(s) is(are) imine and/or aldehyde and/or primary amine functionalised and make it possible to form a composition of crosslinked polymers, advantageously a crosslinked network containing exchangeable bonds, that are exchangeable by aldehyde-imine exchange reaction and/or by imine-imine exchange reaction and/or by imine-primary amine exchange reaction. The silicone may be imine and/or aldehyde and/or primary amine functionalised before the addition of said additive or the addition of said additive can enable the imine and/or aldehyde and/or primary amine functionalisation of the silicone and crosslinking.

To do so, the inventors have devised and developed compositions making it possible to obtain compositions of crosslinked polymers, advantageously networks of polymers, containing crosslinking points and exchangeable pendant functions.

The presence of exchangeable pendant functions and exchangeable functions in the crosslinking points makes it possible to control easily the macroscopic behaviour of the polymer networks formed and to do so independently of the level of crosslinking. Thus, for a given level of crosslinking, a given temperature and a given deformation, a polymer network of the invention will relax stresses quicker if it contains more exchangeable pendant functions. Similarly, for a given level of crosslinking, a given temperature and a given stress, a network of the invention will flow more easily if it contains more exchangeable pendant functions.

Surprisingly, the inventors have been able to prepare with success networks of polymers containing pendant primary aldimine or secondary aldimine functions and/or aldehyde functions and/or primary amine functions and crosslinking points incorporating secondary aldimines.

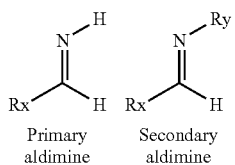

Primary aldimine     Secondary aldimine where Rx and Ry are hydrocarbon groups, identical or different, as defined below.

Compositions of crosslinked silicone polymers have thus been able to be prepared without having to use toxic or costly catalysts. The crosslinking may be carried out at room temperature or at a relatively low temperature, for example 45° C., and may be done so rapidly, in particular in less than 10 hours, advantageously in less than 5 hours, even more advantageously in less than 2 hours and even more advantageously in less than 1 hour.

DESCRIPTION OF THE INVENTION

The object of the invention is a silicon composition comprising (a) crosslinked polymers comprising consecutive —Si—O— units, containing exchangeable pendant bonds and exchangeable crosslinking points, that are exchangeable by aldehyde-imine exchange reactions and/or by imine-imine exchange reactions and/or by imine-primary amine exchange reactions, obtained by crosslinking of linear or branched polymers comprising consecutive —Si—O— units and (b) monofunctional free aldehydes and/or monofunctional free imines and/or monofunctional free primary amines.

Advantageously, these compositions include aldehydes and at least 1 mol % of the aldehyde functions are aromatic aldehyde functions. This molar percentage is calculated with respect to the total number in moles of aldehyde functional groups bound to the polymers or to the molecules.

Advantageously, the silicones, before crosslinking, are linear or branched silicones having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the
polymer by the nitrogen atom.

In an alternative, the composition results from the mixing, in the molten state or in solution, of:
at least one linear or branched silicone, comprising consecutive —Si—O— units P1 having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom
at least one additive bearing at least two imine and/or aldehyde and/or primary amine functional groups able to react with the side groups of the silicone polymer P1 to form a crosslinked network with exchangeable bonds by aldehyde-imine exchange reactions and/or by imine-imine exchange reactions and/or by imine-primary amine exchange reactions;
advantageously, monofunctional free aldehydes.

The additive is advantageously a compound of formula (I) or of formula (II) or a mixture of these compounds, the formulas (I) and (II) meeting the following definitions:

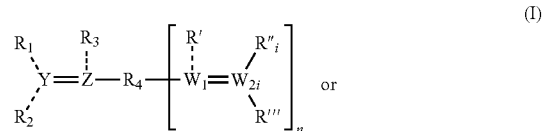

in which n, n', i, the bonds in dashed lines, Y and Z, $R_1$, $R_2$, $R_3$, $W_1$, $W_{2i}$, R', R''$_i$ and R''' are as defined hereafter. $R_4$ and R'$_4$ represent a hydrocarbon group bound to the primary amine and/or imine and/or aldehyde functions by a covalent bond via a carbon atom.

The additive may be a mixture of compounds of formula (I) and of formula (II) when in the compound of formula (I) Z represents N and $W_1$ represents N (without which the compounds of formula (I) and (II) could react together).

The additive may also be a linear or branched silicone, comprising consecutive —Si—O— units P2 bearing:
aldehyde functional groups, or
imine functional groups bound to the polymer by the carbon atom, or
imine functional groups bound to the polymer by the nitrogen atom, or aldehyde functional groups and imine functional groups bound to the polymer by the carbon atom, or
primary amine functional groups, or
primary amine functional groups and imine functional groups bound to the polymer by the nitrogen atom.

In an alternative, the composition results from the mixing, in the molten state or in solution, of:
At least one linear or branched silicone, comprising consecutive —Si—O— units P1' comprising functions enabling grafting,
A combination of molecules including molecules comprising at one end a functional group making it possible to bond in a covalent manner the molecule to the polymer P1' and at the other end a functional group selected from an imine function bound by its carbon atom, an imine function bound by its nitrogen atom, an aldehyde function or a primary amine function, and/or molecules comprising at two of their ends functional groups making it possible to bond in a covalent manner the molecule to the polymer P1' and between its two ends an imine function, the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions;
advantageously, monofunctional free aldehydes.

Advantageously, the aldehyde is a molecule for which the aldehyde function is borne by an aryl, heteroaryl group or the alkene function of a terpenoid.

The invention also relates to a method for preparing a composition of crosslinked polymers, said method comprises the following steps:
Choosing a linear or branched silicone polymer, comprising consecutive —Si—O— units P1 having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom;
Choosing at least one additive bearing at least two imine and/or aldehyde and/or primary amine functional groups capable of reacting with the side groups of the polymer P1 to form a composition of crosslinked polymers containing exchangeable pendant bonds and exchangeable crosslinking points that are exchangeable by aldehyde-imine exchange reactions and/or by imine-imine exchange reactions and/or by imine-primary amine exchange reactions;
Mixing, in the molten state or in solution, said polymer P1, said additive and where appropriate a monofunctional free aldehyde, to obtain said composition.

The invention also relates to a method for preparing a composition of crosslinked polymers, said method comprises the following steps:
Choosing a linear or branched silicone polymer, comprising consecutive —Si—O— units P1' comprising functions enabling grafting,
Choosing a combination of molecules including molecules comprising at one end a functional group making it possible to bond in a covalent manner the molecule to the polymer P1' and at the other end a functional group selected from an imine function bound by its carbon atom, an imine function bound by its nitrogen atom, an aldehyde function or a primary amine function, and/or molecules comprising at two of their ends functional groups making it possible to bond in a covalent manner the molecule to the polymer P1' and between these two ends an imine function, the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions;
Mixing, in the molten state or in solution, said polymer P1', said combination and where appropriate a monofunctional free aldehyde, to obtain said composition.

The invention also relates to the use of aldehyde to catalyse the imine-imine metathesis reactions and the imine-aldehyde exchange reactions carried out in the compositions defined previously.

The invention also relates to a material obtained from the composition according to the invention. The invention also relates to a formulation comprising a composition according to the invention.

The invention also relates to the use of an additive as defined in the invention, or a combination as defined in the invention, in the presence of a linear or branched silicone polymer, comprising consecutive —Si—O— units P1 or P1' for the formation of a composition comprising crosslinked polymers, advantageously a crosslinked network, containing exchangeable pendant bonds and exchangeable crosslinking points that are exchangeable by aldehyde-imine exchange reactions and/or by imine-imine exchange reactions and/or by imine-primary amine exchange reactions and monofunctional free aldehydes and/or monofunctional free imines and/or monofunctional free primary amines.

The invention also relates to combinations for crosslinking linear or branched silicone polymers, comprising consecutive —Si—O— units, said combinations being selected from combinations comprising:
A monofunctional free aldehyde+compound of formula (I), according to the invention;
Compound of formula (II)+compound of formula (I) in which Z represents N and $W_1$ represents N, according to the invention;
A monofunctional free aldehyde+silicone polymer P2, according to the invention;
A and/or B+C, and optionally a monofunctional free aldehyde according to the invention;
A, optionally B, +C and/or E, and optionally a monofunctional free aldehyde according to the invention;
A and/or B and/or C+D and/or E, and optionally a monofunctional free aldehyde according to the invention;
A and/or B+compound of formula (I) for which Z and $W_1$ are N, and optionally a monofunctional free aldehyde according to the invention;
A, optionally B, +compound of formula (II) and optionally a monofunctional free aldehyde, according to the invention; or
C and/or E+compound of formula (I) for which Z and $W_1$ are C, and optionally a monofunctional free aldehyde, according to the invention
A, B, C, D, E meeting the following formulas: (A) $G_1$-Rx-CH=N—Ry, (B) $G_2$-R'x-CH=O, (C) $G_3$-R''y-N=CH—R''x, (D) $G_4$-R'''x-CH=N—R'''y-$G_5$ and (E)

$G_6$-Rw-$NH_2$, where the letters $G_1$, $G_2$, $G_3$, $G_4$, $G_5$ and $G_6$ represent a functional group making it possible to bond in a covalent manner the molecules to the polymer chains to functionalise, Rx, R'x, R''x, R'''x and Ry, R''y, R'''y, Rw are hydrocarbon groups.

The invention also relates to the use of a combination according to the invention, in the presence of a linear or branched silicone polymer, comprising consecutive —Si—O— units P1 or P1' for the formation of a composition comprising crosslinked polymers, advantageously a crosslinked silicone network, containing exchangeable pendant bonds and exchangeable crosslinking points that are exchangeable by aldehyde-imine exchange reactions and/or by imine-imine exchange reactions and/or by imine-primary amine exchange reactions and monofunctional free aldehydes and/or monofunctional free imines and/or monofunctional free primary amines, in particular to modify the rheology of a composition, such as an oil, a paint or a cosmetic formulation, comprising said polymer P1 or P1' by addition to the composition of the combination according to the invention; the rheology is modified by choosing the concentration in said combination.

Definitions

Definition of Silicone, Linear Silicone, Branched Silicone:

A silicone or poly(dialkyl siloxane) is a polymer. A polymer is constituted of a set of polymer chains of different molecular dimensions, notably of different molar masses. A polymer chain according to this invention is a sequence of atoms uniquely bound by —Si—O— and optionally C—C, C=C, C—X or C=X covalent bonds, where X is a chemical element other than carbon, advantageously with the exception of the C=N double bond for the main chain. The polymer chains are derived from the covalent assembly of a large number of repeating units called monomer units. The polymer chains thereby defined have molecular dimensions (characterised by their molar mass) much greater than those of simple molecules and are derived from the covalent assembly of more than 5 monomer units, advantageously of more than 20 monomer units, even more advantageously of more than 50 monomer units.

In the sense of the present invention, "silicone" is taken to mean any polymer comprising consecutive —Si—O— units and optionally C—C, C=C, C—X or C=X units, where X is a chemical element other than carbon, advantageously with the exception of the C=N double bond for the main chain. In the —Si—O— units, the silicon atom is advantageously substituted by two $C_1$-$C_6$ alkyl groups. Advantageously the —Si—O— units represent more than 10 mol % of the repeating units, more advantageously more than 20% of the repeating units, more advantageously more than 30% of the repeating units, more advantageously more than 50% of the repeating units, more advantageously more than 70% of the repeating units, even more advantageously more than 90% of the repeating units.

Polymer chains constituted of a single type of monomer unit are called homopolymers. Polymer chains constituted of several types of monomer unit are called copolymers. According to this invention, polymer and polymer chain are taken to mean not just homopolymers but also copolymers.

The monomer units constituting the chain polymer may be bound to a variable number of other monomer units. The number of other monomer units to which a monomer unit is bound is known as valency. A monomer unit that is bound to a single other monomer unit has a valency of 1 and corresponds to one end of a polymer chain. A monomer unit which is bound to two other monomer units has a valency of 2 and corresponds to a linear sequence of a polymer chain. A monomer unit that is bound to more than two other monomer units has a valency greater than 2 and corresponds to a branching point. A polymer chain that comprises two ends is a linear polymer chain. A linear polymer chain is thus composed of monomer units having a valency of 2 and of two monomer units having a valency of 1. A polymer chain that has more than two ends and of which the molar mass has a finite value is a ramified or branched polymer chain. A ramified or branched polymer chain is thus composed of monomer units having a valency of 2, of monomer units having a valency greater than 2 and of more than two monomer units having a valency of 1.

According to this invention polymer and polymer chain are taken to mean not just linear polymers and polymer chains but also branched polymers and polymer chains.

Definition of a Pendant Function:

A function is pendant if it is bound by a covalent bond by one and only one of its hydrocarbon substituents (Rx or Ry of aldimines or aldehyde, Rw of amines, see following definition) to a monomer unit having a valency greater than 1. In other words, a function is pendant if it is bound by a covalent bond to a polymer chain by one and uniquely one of its hydrocarbon substituents (Rx or Ry of aldimines or aldehyde, Rw of amines, see following definition) and if it does not constitute one end of the polymer chain.

A function is terminal, or constitutes one end of a chain, if it is bound by a covalent bond by one and uniquely one of its hydrocarbon substituents (Rx or Ry, aldimines or aldehyde, Rw of amines, see following definition) to a monomer unit having a valency equal to 1.

An imine function forms part of a crosslinking point if it is bound by its hydrocarbon substituent Rx, via a covalent bond, to a monomer unit connected in a covalent manner to at least two other monomer units not including said imine function, and if it is bound by its hydrocarbon substituent Ry, via a covalent bond, to a monomer unit connected in a covalent manner to at least two other monomer units not including said imine function.

Thus, the term "pendant group", is taken to mean, in the sense of the present invention, a side group of the polymer chain. The term "side group", in the sense of the present invention, designates a substituent that is not an oligomer or a polymer. The terms "side" or "pendant" will be used indiscriminately. A side group is not integrated in the main chain of the polymer. The term "pendant imine group" is taken to mean, in the sense of the present invention, a side group comprising a primary aldimine or secondary aldimine function. In the presence of a secondary aldimine, Rx-C=NH—Ry, one of these two substituents (Rx or Ry) is not bound to a polymer chain, if it is not via the imine function. The imine may be bound to the side group by its carbon or nitrogen atom. The term "pendant aldehyde group" is taken to mean, in the sense of the present invention, a side group comprising an aldehyde. The term "pendant primary amine group" is taken to mean, in the sense of the present invention, a side group comprising a —$NH_2$ function.

Definition of a Free Molecule:

According to this invention, a molecule is designated "free" if it is not bound by a covalent bond to a polymer of the composition.

According to this invention, a "monofunctional free aldehyde" is a free molecule containing one and only one aldehyde function. A "monofunctional free aldehyde" may, or not, contain one or more other functions as long as they are not imine, aldehyde or primary amine functions.

According to this invention, a "monofunctional free imine" is a free molecule containing one and only one imine function. A "monofunctional free imine" may, or not, contain one or more other functions as long as they are not imine, aldehyde or primary amine functions.

According to this invention, a "monofunctional free primary amine" is a free molecule containing one and only one primary amine function. A "monofunctional free primary amine" may, or not, contain one or more other functions as long as they are not imine, aldehyde or primary amine functions.

Definition of Crosslinking:

Crosslinking, or crosslinking of polymer chains, consists in creating covalent chemical links between polymer chains initially not bound to each other by covalent bonds. The crosslinking is accompanied by an increase in the connectivity, via covalent bonds, between the different polymer chains constituting the polymer. The crosslinking of linear or branched polymer chains is accompanied by an increase in the molecular dimensions of the chains, notably of the molar masses, and may lead to a network of crosslinked polymers being obtained. The crosslinking of a network of crosslinked polymers is accompanied by an increase in the insoluble fraction by weight in a good non-reactive solvent according to the definition given hereafter.

Within the scope of the invention, the crosslinking results notably from metathesis reactions between the imine functions and/or exchange reactions between the imine and aldehyde functions and/or exchange reactions between the imine and primary amine functions borne by the pendant groups of the polymers and/or borne by the pendant groups of the polymers and by the compounds of formula (I) and/or (II). Advantageously, the crosslinking results exclusively from metathesis reactions between the imine functions and/or exchange reactions between the imine and aldehyde functions and/or exchange reactions between the imine and primary amine functions borne by the pendant groups of the polymers and/or borne by the pendant groups of the polymers and by the compounds of formula (I) and/or (II). Thus, for any crosslinking reaction by metathesis reaction between imine functions, respectively for any crosslinking reaction by exchange reaction between imine and aldehyde functions, respectively for any crosslinking reaction by exchange reaction between imine and primary amine functions, one equivalent of monofunctional free imine, respectively one equivalent of monofunctional free aldehyde, respectively one equivalent of monofunctional free primary amine, is generated, as illustrated by FIG. 3 in the case of the crosslinking by metathesis reaction of linear polymers functionalised by complementary pendant imine functions.

The term "network of crosslinked polymers" is taken to mean, in the sense of the present invention, a set of polymer and/or oligomer chains bound together by covalent bonds and which immersed at a dilution by weight of 7, advantageously of 10 in a good non-reactive solvent of the polymer and/or oligomer chains constituting it will have an insoluble weight fraction greater than 0.1%, advantageously greater than 0.5%, 1%, 2%, 5%, 10%, 20%, 30%, 40%, 50%, 70% after 48 hours of immersion at atmospheric pressure and for a temperature comprised between the melting temperature and the boiling temperature of the solvent. A good non-reactive solvent is a good solvent that is not going to degrade the polymer chains, the imine, aldehyde or primary amine functions, and which will not participate in the imine-imine, aldehyde-imine or primary amine-imine exchange reactions. The insolubility may be evaluated with the naked eye or by passing the formulation on a filter having a porosity of 0.2 micrometres, advantageously 0.4 micrometres, even more advantageously 1 micrometre.

The crosslinking is accompanied by the creation of crosslinking points binding between them at least two polymer chains. These crosslinking points advantageously include imine functions. Thus, after crosslinking, the composition comprises imine functions in the crosslinking points and advantageously polymers comprising pendant imine and/or aldehyde and/or primary amine functions.

Advantageously, the crosslinked polymers and the networks of crosslinked polymers of the invention contain/may contain thermoreversible chemical links. As a non-limiting example of thermoreversible links may be cited the cycloadducts obtained by Diels-Alder reaction ("Diels-Alder reactions recent applications in polymer and material science", Mehmet Atilla Tasdelen, Polym. Chem., 2011, 2, 2133), alkoxyamine functions ("Nitroxide-mediated polymerization", Julien Nicolas et al., Progress in Polymer Science 38 (2013) 63) or disulphides ("Self-healing polymers based on thermally reversible Diels-Alder chemistry", Ying-Ling Liu and Tsai-Wei Chuo, Polym. Chem., 2013, 4, 2194).

Definition of Polymer Composition:

A polymer composition is defined as a homogenous or non-homogenous mixture of linear or branched polymers, being able to be bound by crosslinking points, containing exchangeable pendant bonds and exchangeable crosslinking points that are exchangeable by aldehyde-imine exchange reactions and/or by imine-imine exchange reactions and/or by imine-primary amine exchange reactions with potentially various fillers, additives or solvents, as defined hereafter.

Thus, the formula "composition of polymers" is taken to mean not just solid formulations, containing no or little solvent(s) but also liquid formulations, containing a more important fraction by weight of solvent(s).

Thus, the term "formulation" is taken to mean not just solid formulations but also liquid formulations.

According to the invention, a solid formulation contains less than 30% by weight of solvent(s), more advantageously less than 25% by weight of solvent(s), even more advantageously less than 20% by weight of solvent(s), even more advantageously less than 15% by weight of solvent(s), even more advantageously less than 10% by weight of solvent(s), even more advantageously less than 5% by weight of solvent(s), even more advantageously less than 2.5% by weight of solvent(s), even more advantageously less than 1% by weight of solvent(s), even more advantageously less than 0.5% by weight of solvent(s).

According to the invention, a solid formulation is a material.

According to the invention, a liquid formulation contains more than 30% by weight of solvent(s), more advantageously more than 50% by weight of solvent(s), even more advantageously more than 60% by weight of solvent(s), even more advantageously more than 70% by weight of solvent(s), even more advantageously more than 75% by weight of solvent(s).

According to the invention, a liquid formulation may be a material.

A solvent is defined as a molecule, or a mixture of molecules, liquid at room temperature and which has the property, at room temperature, of dissolving and/or diluting other substances without modifying them chemically and without itself being modified. Among solvents may be distinguished good solvents which have the property of dissolving at room temperature substances without modifying them chemically and without itself being modified, and poor solvents which have the property of diluting without dissolving or chemically modifying substances at room temperature and without itself being modified.

A solvent may thus be a good solvent for one compound and a poor solvent for another compound.

As non-limiting examples may be cited as solvent, ethyl acetate, butyl acetate, acetone, acetonitrile, benzyl alcohol, acetic anhydride, anisole, benzene, butanol, butanone, chlorobenzene, chloroform, cyclohexane, dichloroethane, dichloromethane, dimethylformamide, dimethylsulphoxide, dioxane, water, ethanol, glycol ether, diethyl ether, ethylene glycol, heptane, hexane, mineral oils, natural oils, synthetic oils, hydrocarbons, methanol, pentane, propanol, propoxypropane, pyridine, tetrachloroethane, tetrachloromethane, terahydrofuran, toluene, trichlorobenzene, xylene, and mixtures thereof.

Definition of Radicals:

"Hydrocarbon" group is taken to mean, in the sense of the present invention, a group comprising carbon atoms and hydrogen. This group may also comprise heteroatoms and/or be substituted by halogens. The hydrocarbon group advantageously comprises from 1 to 50, preferably 1 to 18, preferably 1 to 12, carbon atoms.

"Heteroatom" is taken to mean, in the sense of the present invention, sulphur, nitrogen, oxygen, boron, phosphorous and silicon atoms.

"Halogen" is taken to mean, in the sense of the present invention, fluorine, chlorine, bromine and iodine atoms.

The hydrocarbon groups may be aliphatic or aromatic.

"Aliphatic" is taken to mean, in the sense of the present invention, an "alkyl", "alkenyl", "alkanediyl", "alkenediyl", "cycloalkyl" group. The valency of the group will be determined on a case by case basis.

The aliphatic group may comprise heteroatoms. In particular, it may be interrupted by ester, amide, ether, thioether, secondary or tertiary amine, carbonate, urethane, carbamide, anhydride functions. Where appropriate, the aliphatic group may be substituted notably by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical, or by a functional group selected from functional groups polymerisable by radical polymerisation, aldehyde and/or imine functions.

"Alkyl" group is taken to mean, in the sense of the present invention, a hydrocarbon chain, saturated or unsaturated, linear or ramified, advantageously comprising 1 to 50, preferably 1 to 18, preferably 1 to 12, carbon atoms, and which may comprise one or more heteroatoms. Thus, through misuse of language, in the sense of the invention, the term "alkyl" also encompasses:

"alkenyls", that is to say hydrocarbon chains comprising at least one double bond;
"heteroalkyls", that is to say alkyl groups as defined previously comprising at least one heteroatom.

"Alkanediyl" group is taken to mean, in the sense of the present invention, a divalent hydrocarbon chain, saturated or unsaturated, linear or ramified, advantageously comprising from 1 to 50, preferably 1 to 18, preferably 1 to 12, carbon atoms and which may comprise one or more heteroatoms. Thus, through misuse of language, in the sense of the invention, the term "alkanediyl" also encompasses "alkenediyls", that is to say hydrocarbon chains comprising at least one double bond, such as for example, a vinylene (ethenylene) or propenylene group and "hetero alkanediyl", that is to say alkanediyl groups as defined previously comprising at least one heteroatom.

"Terpenoid" is taken to mean according to the invention any group comprising a backbone close to a terpene. A "terpene" designates a derivative of isoprene that is obtained by the connection of $C_5H_8$ units, leading for example to monoterpenes, sesquiterpenes. "Close" is taken to mean that the backbone is similar to a terpene or different in that at least one alkyl substituent, normally present, may be absent or borne by another atom. The backbone may further be substituted by varied radicals such as aliphatic, oxy radicals, aldehydes, esters, alcohols, ethers and the sulphurous or nitrogenous equivalents thereof. On a case by case basis, this "terpenoid" group will be monovalent or divalent.

"Cycloalkyl" group is taken to mean, in the sense of the present invention, a cyclic alkyl chain, saturated or partially unsaturated, but non aromatic, advantageously comprising from 3 to 10 cyclic carbon atoms. The alkyl chain may comprise one or more heteroatoms, then the term "heterocycloalkyl" is used specifically. The group may comprise more than one ring and thereby comprise fused, bound or spiro rings. As an example, cyclopropyl, cyclopentyl, cyclohexyl, cycloheptyl, pyrrolidinyl, piperidinyl, piperazinyl or morpholinyl groups may be cited. Where appropriate, the cycloalkyl group may be substituted notably by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical, or by a functional group selected from functional groups polymerisable by radical polymerisation, aldehyde and/or imine functions. Where appropriate, the cycloalkyl group could be divalent, then advantageously the term "cycloaliphatic" radical will be used.

"Aromatic", is taken to mean, in the sense of the present invention, a monovalent or multivalent group comprising an aromatic hydrocarbon group. The valency of the group will be determined on a case by case basis.

The aromatic group may comprise heteroatoms, the term "heteroaromatic" radical is then specifically used. In particular, it may be interrupted by ester, amide, ether, thioether, secondary or tertiary amine, carbonate, urethane, carbamide, anhydride functions. The aromatic group may comprise one or more rings joined or bound in a covalent manner. Where appropriate, the aromatic group may be substituted notably by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical, or by a functional group selected from functional groups polymerisable by radical polymerisation, aldehyde and/or imine functions.

The term "aromatic" encompasses. "arylaliphatic" groups, that is to say a group comprising at least one aromatic group and at least one aliphatic group, as defined. The aliphatic group may be bound to a part of the molecule and the aromatic group may be bound to another part of the molecule. The group may comprise two aromatic groups, each bound to one part of the molecule, and bound together by an aliphatic chain.

"Aryl" is taken to mean, in the sense of the present invention, an aromatic hydrocarbon group. The term "aryl"

encompasses aralkyl and alkyl-aryl groups. The aromatic hydrocarbon group may be substituted one or more times notably by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical, or by a functional group selected from functional groups polymerisable by radical polymerisation, aldehyde and/or imine functions.

"Alkyl-aryl" is taken to mean, in the sense of the present invention, an alkyl group as defined above, bound to the remainder of the molecule through an aromatic group as defined above.

"Aralkyl" is taken to mean, in the sense of the present invention, an aryl group as defined above, bound to the remainder of the molecule through an aliphatic group as defined above.

"Heteroaryl" is taken to mean, in the sense of the present invention, an aryl group for which at least one of the atoms of the aromatic ring is a heteroatom. "Heteroalkyl-aryl", is taken to mean, in the sense of the present invention, an alkyl-aryl group as defined substituted by at least one heteroatom. "Heteroaralkyl" is taken to mean, in the sense of the present invention, an aralkyl group as defined substituted by at least one heteroatom.

"Primary amine" is taken to mean, in the sense of the present invention, a group bearing a $NH_2$ function.

The term "imine" is taken to mean, in the sense of the present invention, a group comprising the C=N function. In the sense of the invention the imine is a primary or secondary aldimine:

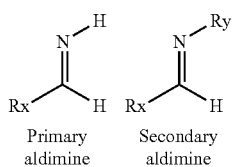

Primary aldimine    Secondary aldimine where Rx and Ry are different from H and may be identical or different. Rx and Ry are hydrocarbon radicals as defined above. Advantageously, the imine is a secondary aldimine. In the sense of the invention, the radicals Rx and Ry are bound to the imine function by a covalent bond via a carbon atom. The imine and aldehyde groups of the invention have the following structures:

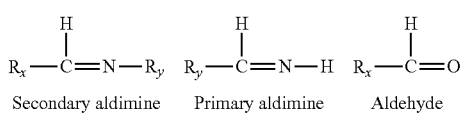

Secondary aldimine    Primary aldimine    Aldehyde where Rx and Ry are hydrocarbon groups and where the atom of the groups Rx and Ry bound to the imine function or aldehyde is a carbon atom.

In particular, independently for each group, Rx represents an alkyl, aryl, aralkyl, alkyl-aryl or cycloalkyl radical. This radical may contain heteroatoms, in particular selected from O, N, S or Si, and/or may be substituted. Rx is advantageously an aryl, heteroaryl or terpenoid group. Advantageously, when the aldehyde function is borne by a terpenoid group, the aldehyde function is directly bound to an alkene function of the terpenoid.

In particular, this radical Rx may be substituted by functional groups, such as ester or amide functions. In particular, this radical is substituted by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical. In particular, this radical Rx may be interrupted by ester, amide, ether, thioether, secondary or tertiary amine, carbonate, urethane, carbamide, anhydride functions.

In particular, independently for each group, Ry represents an alkyl, aryl, aralkyl, alkyl-aryl or cycloalkyl radical. This radical may contain heteroatoms, in particular selected from O, N, S or Si, and/or may be substituted. In particular, this radical Ry may be substituted by functional groups, such as ester or amide functions. In particular, this radical is substituted by a halogen, a —Rz, —OH, —NHRz, —NRzR'z, —C(O)—OH, —C(O)—NRzR'z, —C(O)—O—Rz, —O—C(O)—Rz, O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical. In particular, this radical Ry may be interrupted by ester, amide, ether, thioether, secondary or tertiary amine, carbonate, urethane, carbamide, anhydride functions.

These imine, aldehyde and primary amine groups are advantageously bound, by Rx and/or Ry, respectively Rw, to a polymer chain or to a functional group G making it possible to bond in a covalent manner the molecules to the polymer chains to functionalise, as defined hereafter.

DESCRIPTION OF THE FIGURES

FIG. 1. Representation of molecules being able to be used for the functionalisation and the crosslinking in one step of the polymers P1'.

FIG. 2. Schematic representation of the functionalisation of linear polymers P1' by the molecule A (left), respectively the molecule C (right), via the creation of covalent bonds between the molecules A, respectively C, and the polymer chains. The functions enabling the grafting of the molecules A (left), respectively the molecule C (right), may form part of the main chain (top) or side/pendant groups (bottom) of the linear polymer to functionalise.

FIG. 3. Schematic representation of the crosslinking by metathesis reaction of linear polymers functionalised by complementary pendant imine functions.

DETAILED DESCRIPTION

The object of the invention is a silicon composition comprising (a) crosslinked polymers comprising consecutive —Si—O— units containing exchangeable pendant bonds and exchangeable crosslinking points that are exchangeable by aldehyde-imine exchange reactions and/or by imine-imine exchange reactions and/or by imine-primary amine exchange reactions, obtained by crosslinking of linear or branched polymers comprising consecutive —Si—O— units, (b) monofunctional free aldehydes and/or monofunctional free imines and/or monofunctional free primary amines. The crosslinking results, in part or totally, from metathesis reactions between the imine functions and/or exchange reactions between the imine and aldehyde functions and/or exchange reactions between the imine and primary amine functions borne by the pendant groups of the polymers and/or borne by the pendant groups of the polymers and the compounds of formula (I) and/or (II). Thus, for any crosslinking reaction by metathesis reaction between imine functions, respectively for any crosslinking reaction by exchange reaction between imine and aldehyde functions, respectively for any crosslinking reaction by exchange reaction between imine and primary amine functions, one equivalent of monofunctional free imine, respectively one equivalent of monofunctional free aldehyde, respectively one equivalent of monofunctional free primary amine, is generated, as illustrated by FIG. 3 in the case of the crosslinking by metathesis reaction of linear polymers functionalised by complementary pendant imine functions. Such a composition advantageously forms a network of crosslinked linear or branched polymers containing exchangeable pendant bonds and exchangeable crosslinking points that are exchangeable by aldehyde-imine exchange reactions and/or by imine-imine exchange reactions and/or by imine-primary amine exchange reactions.

The polymers, before crosslinking, are advantageously linear or branched polymers having side groups bearing:
aldehyde functional groups, or
pendant imine functional groups bound to the polymers by their carbon atom, or
pendant imine functional groups bound to the polymers by their nitrogen atom, or
pendant aldehyde functional groups and imine functional groups bound to the polymers by their carbon atom, or
primary amine functional groups, or
primary amine functional groups and imine functional groups bound to the polymer by the nitrogen atom.

These polymers may be functionalised prior to and/or during crosslinking advantageously leading to the formation of a network of crosslinked polymers containing exchangeable crosslinking points and exchangeable pendant bonds that are exchangeable by aldehyde-imine exchange reactions and/or by imine-imine exchange reactions and/or by imine-primary amine exchange reactions.

The side groups exchangeable by aldehyde-imine exchange reactions and/or by imine-imine exchange reactions and/or by imine-primary amine exchange reactions of linear or branched polymers are advantageously spread out over the whole of the chain. Thus, preferably, the linear or branched polymers do not have a di-block structure, with one block containing side groups and one block not containing side groups exchangeable by aldehyde-imine exchange reactions and/or by imine-imine exchange reactions and/or by imine-primary amine exchange reactions. Preferably, the side groups exchangeable by aldehyde-imine exchange reactions and/or by imine-imine exchange reactions and/or by imine-primary amine exchange reactions are spread out in a random manner over the whole of the polymer chain. Preferably, if the side groups exchangeable by aldehyde-imine exchange reactions and/or by imine-imine exchange reactions and/or by imine-primary amine exchange reactions are spread out in blocks, then the polymer has a multiblock structure with blocks containing exchangeable side groups spread out all along the polymer chain.

When the polymers before crosslinking are branched polymers, these polymers are advantageously not dendrimers. When the branched polymers before crosslinking are dendrimers, these dendrimers are advantageously third generation dendrimers or second generation dendrimers.

In a first alternative, the polymer is functionalised before crosslinking. In particular, the composition results from the mixing, in the molten state or in solution, of:
at least one linear or branched polymer P1 having side groups bearing:
aldehyde functional groups, or
imine functional groups bound to the polymer by their carbon atom, or
imine functional groups bound to the polymer by their nitrogen atom,
aldehyde functional groups and imine functional groups bound to the polymer by their carbon atom,
primary amine functional groups, or
primary amine functional groups and imine functional groups bound to the polymer by the nitrogen atom.
at least one additive bearing at least two pendant imine and/or aldehyde and/or primary amine functional groups able to react with the pendant groups of the polymer P1 to form the composition of crosslinked polymers, advantageously a crosslinked network, containing crosslinking points and exchangeable pendant bonds that are exchangeable by aldehyde-imine and/or imine-imine and/or imine-primary amine exchange reactions
Advantageously, monofunctional free aldehydes.

To enable the formation of a composition of crosslinked polymers, advantageously a network of crosslinked polymers, with exchangeable bonds, as additive is advantageously used a crosslinking means which, used alone, is not going to react with itself and lose its functionalities. Thus, the crosslinking means bear:
aldehyde functions, or
imine functions bound by means of their carbon atom, or
imine functions bound by means of their nitrogen atom, or
aldehyde functions and imine functions bound by means of their carbon atom, or
primary amine functions, or
primary amine functions and imine functions bound by means of their nitrogen atom.

The additive, crosslinking means, may be a molecule and/or a polymer. Where appropriate, combinations of molecules and/or polymers may be envisaged.

In a first alternative, the additive is a molecule comprising at least two imine and/or aldehyde functions. This additive is also designated "bi- or multifunctional crosslinking means". This additive may comprise uniquely imine functions, all bound to the remainder of the molecule by the carbon atom of the imine bond, or uniquely imine functions, all bound to the remainder of the molecule by the nitrogen atom of the imine bond, or uniquely aldehyde functions. It may also comprise both aldehyde functions and imine functions, all bound to the remainder of the molecule by the carbon atom of the imine bond.

This additive is advantageously a compound of following formula (I):

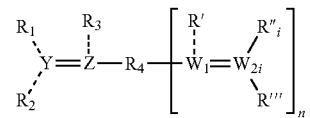

in which
n is an integer varying from 1 to 6;
i is an integer varying from 1 to n the bonds in dashed lines are present or absent, as a function of the valency of Y, Z, $W_1$, $W_{2i}$, Y and Z are different and each represents either C or N, or Y is O and then Z is C when Y represents C, then Z represents N, and $R_1$ represents a hydrocarbon group, $R_2$ represents H and $R_3$ is absent, when Y represents N, then Z represents C, and $R_1$ represents H or a hydrocarbon group, $R_2$ is absent and $R_3$ represents H, when Y is O, then Z is C and, $R_1$, $R_2$ are absent and $R_3$ represents H $R_4$ represents a hydrocarbon group bound to the imine and/or aldehyde functions by a covalent bond via a carbon atom in each block $W_1(R')\!=\!W_{2i}(R''_i)(R''')$, $W_1$ and $W_{2i}$ are different and each represents either C or N, or $W_{2i}$ is O and then $W_1$ is C when $W_{2i}$ represents C, then $W_1$ represents N and R' is absent, $R''_i$ represents a hydrocarbon group and R''' represents H, when $W_{2i}$ represents N, then $W_1$ represents C and R' represents H, $R''_i$ represents H or a hydrocarbon group, and R''' is absent, when $W_{2i}$ is O, then $W_1$ is C and $R''_i$, R''' are absent and R' represents H when Z represents C, then $W_1$ represents C, when Y represents C, then $W_{2i}$ represents C.

$R_4$ may in particular represent a ring thereby enabling the presence of several blocks $[W_1(R')\!=\!W_{2i}(R''_i)(R''')]$, optionally on each carbon atom of the ring.

The block $[W_1(R')\!=\!W_{2i}(R''_i)(R''')]$ is present n times as a function of the number of possible substitutions on the radical $R_4$. The compound (I) may thus be a compound called "star-shaped".

n is an integer varying from 1 to 6, preferably from 1 to 4.

i is an integer varying from 1 to n.

From one block to the other (and thus for different values of i), the definition of $W_{2i}$ or $R''_i$ can vary, which signifies that the blocks are not necessarily identical to each other. Conversely, the definition of $W_1$ cannot vary from one block to the other, either always C, or always N. Similarly the definition of R' cannot vary from one block to the other, either always H, or always absent. Similarly, the definition of R''' cannot vary from one block to the other, either always H, or always absent.

$R_4$ may be bound to the carbon atom or to the nitrogen atom of the imine and/or aldehyde functions. $R_4$ is bound to the imine and/or aldehyde functions by a covalent bond via a carbon atom. $R_4$ is advantageously an aliphatic, aromatic, arylaliphatic or cycloaliphatic group that may also comprise heteroatoms such as O, N, S, or Si. In an advantageous alternative, $R_4$ represents an aromatic or heteroaromatic group. Advantageously, $R_4$ represents a $C_1$-$C_{12}$ alkanediyl group, a benzene ring, a naphthalene ring, an arylaliphatic group composed of two benzene rings bound by a $C_1$-$C_6$ alkanediyl group, a pyrimidine ring, a triazine ring.

Advantageously, when Y represents O, then Z represents C, $W_1$ represents C, $W_{2i}$ represents O, $R_1$, $R_2$, $R''_i$, R''' are absent and $R_3$ and R' represent H.

Advantageously, when Y represents N or O, then Z represents C, $W_1$ represents C, $W_{2i}$ represents N or O, $R_2$ and R''' are absent, $R_3$ and R' represent H, and, as a function of the valency of Y, $W_{2i}$, $R_1$ and $R''_i$ represent a hydrocarbon group or are absent when Y and $W_{2i}$ represent O.

Advantageously, when Y represents C, then Z represents N, $W_1$ represents N, $W_{2i}$ represents C, $R_3$ and R' are absent, $R_2$ and R''' represent H, $R_1$ and $R''_i$ represents a hydrocarbon group.

When it is present, advantageously $R_1$ represents a hydrogen atom, an alkyl, alkenyl, aryl, cycloalkyl, heteroaryl, heteroalkyl, heterocycloalkyl group, each of these groups may be substituted. $R_2$ represents H or is absent. $R_3$ represents H or is absent. Preferably, $R_1$ represents an alkyl, alkenyl, aryl, heteroaryl, alkyl-aryl, heteroalkyl-aryl, aralkyl, heteroarlalkyl, cycloalkyl or heterocycloalkyl group; each of these groups may be substituted.

When it is present, advantageously R''$_i$ represents a hydrogen atom, an alkyl, alkenyl, aryl, cycloalkyl, heteroaryl, heteroalkyl, heterocycloalkyl group, each of these groups may be substituted. R' represents H or is absent. R''' represents H or is absent. Preferably, $R''_i$ represents an alkyl, alkenyl, aryl, heteroaryl, alkyl-aryl, heteroalkyl-aryl, aralkyl, heteroarlalkyl, cycloalkyl or heterocycloalkyl group; each of these groups may be substituted.

Alternatively or in addition, the additive is a molecule comprising a primary amine function. This additive is advantageously a compound of following formula (II):

in which n' is an integer varying from 1 to 6;

$R'_4$ represents a hydrocarbon group bound to the amine functions by a covalent bond via a carbon atom $R'_4$ may in particular represent a ring thereby enabling the presence of several blocks $[NH_2]$, optionally on each carbon atom of the ring.

The block $[NH_2]$ is present n' times as a function of the number of possible substitutions on the radical $R'_4$. The compound (II) may thus be a so-called "star-shaped" compound.

n' is an integer varying from 1 to 6, preferably from 1 to 4.

$R'_4$ is bound to the primary amine functions by a covalent bond via a carbon atom. $R'_4$ is advantageously an aliphatic, aromatic, arylaliphatic or cycloaliphatic group that may also comprise heteroatoms such as O, N, S, or Si. In an advantageous alternative, $R'_4$ represents an aromatic or heteroaromatic group. Advantageously, $R'_4$ represents a $C_1$-$C_{12}$ alkanediyl group, a benzene ring, a naphthalene ring, an arylaliphatic group composed of two benzene rings bound by a $C_1$-$C_6$ alkanediyl group, a pyrimidine ring, a triazine ring.

When the compound of formula (II) is used in a mixture with the compound of formula (I), then the compound of formula (I) is such that Z represents N and $W_1$ represents N.

The choice of the nature of the functional groups present on the compound of formula (I) and the choice of the compounds (I), (II) or mixtures thereof, is going to depend on the nature of the functional groups present on these side groups of the polymer P1.

Thus, when the pendant groups of the polymer P1 bear aldehyde functional groups, as additive is chosen a compound of formula (I) in which Z and $W_1$ represent N.

Thus, when the pendant groups of the polymer P1 bear imine functional groups bound to the main chain by the carbon atom, as additive is chosen a compound of formula (I) in which Z and $W_1$ represent N, a compound of formula (II) or a mixture of compound of formula (I) in which Z and $W_1$ represent N and compound of formula (II).

Thus, when the pendant groups of the polymer P1 bear aldehyde functional groups and imine functional groups bound to the main chain by the carbon atom, as additive is chosen a compound of formula (I) in which Z and $W_1$ represent N, a compound of formula (II) or a mixture of compound of formula (I) in which Z and $W_1$ represent N and compound of formula (II).

Thus, when the pendant groups of the polymer P1 bear imine functional groups bound to the main chain by the nitrogen atom, as additive is chosen a compound of formula (I) in which Z and $W_1$ represent C, Y and $W_{2i}$ represent, each independently of each other, N or O.

Thus, when the pendant groups of the polymer P1 bear primary amine functional groups, as additive a compound is chosen of formula (I) in which Z and $W_1$ represent C, Y and one $W_{2i}$ at least represents N, the other $W_{2i}$ represents, each independently of each other, N or O where appropriate.

Thus, when the pendant groups of the polymer P1 bear primary amine functional groups and imine functional groups bound to the main chain by the nitrogen atom, as additive is chosen a compound of formula (I) in which Z and $W_1$ represent C, Y and $W_{2i}$ represent, each independently of each other, N or O.

In a second alternative, the additive is a polymer P2 bearing:
- aldehyde functional groups, or
- pendant imine functional groups bound to the polymer by the carbon atom, or
- pendant imine functional groups bound to the polymer by the nitrogen atom, or
- pendant aldehyde functional groups and pendant imine functional groups bound to the polymer by the carbon atom, or
- primary amine functions, or
- primary amine functions and imine functions bound by means of their nitrogen atom.

The choice of the nature of the functional groups present on the polymer P2 is going to depend on the nature of the functional groups present on the polymer P1.

Thus, when the pendant groups of the polymer P1 bear aldehyde functional groups, as polymer P2 is chosen a silicone having side groups bearing imine functional groups bound to the main chain by their nitrogen atoms, a silicone comprising side groups bearing primary amine functional groups and side groups bearing imine functional groups bound to the polymer by the nitrogen atom.

Thus, when the pendant groups of the polymer P1 bear imine functional groups bound to the main chain by the carbon atom, as polymer P2 is chosen a silicone of which the side groups bear imine functional groups bound to the main chain by their nitrogen atoms, a silicone of which the side groups bear primary amine functional groups, a silicone comprising side groups bearing primary amine functional groups and side groups bearing imine functional groups bound to the main chain by their nitrogen atoms.

Thus, when the pendant groups of the polymer P1 bear aldehyde functional groups and imine functional groups bound to the main chain by the carbon atom, as polymer P2 is chosen a silicone comprising side groups bearing primary amine functional groups, a silicone comprising side groups bearing imine functional groups bound to the polymer by the nitrogen atom, a silicone comprising side groups bearing primary amine functional groups and side groups bearing imine functional groups bound to the main chain by their nitrogen atoms.

Thus, when the pendant groups of the polymer P1 bear imine functional groups bound to the main chain by the nitrogen atom, as polymer P2 is chosen a silicone of which the side groups bear imine functional groups bound to the main chain by their carbon atoms, a silicone of which the side groups bear aldehyde functional groups, a silicone comprising side groups bearing aldehyde functional groups and side groups bearing imine functional groups bound to the polymer by the carbon atom.

Thus, when the pendant groups of the polymer P1 bear primary amine functional groups, as polymer P2 is chosen a silicone comprising side groups bearing imine functional groups bound to the polymer by the carbon atom, a silicone comprising side groups bearing aldehyde functional groups and side groups bearing imine functional groups bound to the polymer by the carbon atom.

Thus, when the pendant groups of the polymer P1 bear primary amine functional groups and imine functional groups bound to the main chain by their nitrogen atoms, as polymer P2 is chosen a silicone comprising side groups bearing aldehyde functional groups, a silicone comprising side groups bearing imine functional groups bound to the polymer by the carbon atom, a silicone comprising side groups bearing aldehyde functional groups and side groups bearing imine functional groups bound to the polymer by the carbon atom.

The invention thus makes it possible to assemble, by aldehyde-imine exchange reactions and/or by imine-imine exchange reactions and/or by imine-primary amine exchange reactions, two linear or branched polymers, even if the chemical natures of the polymers are different. It may also be envisaged to assemble a polymer composition according to the invention with a linear or branched polymer P2 according to the same principle. This principle may be extended to two compositions according to the invention which may be assembled.

The additives are advantageously selected such that:
- the silicone polymer P1 has side groups bearing imine functional groups bound to the main chain by their carbon atoms and the additive is selected from: a silicone polymer P2 of which the side groups bear imine functional groups bound to the main chain by their nitrogen atoms, a silicone polymer P2 of which the side groups bear primary amine functional groups, a silicone polymer P2 comprising side groups bearing primary amine functional groups and side groups bearing imine functional groups bound to the main chain by their nitrogen atoms, a compound of formula (I) in which the atoms Z and $W_1$ represent N, a compound of formula (II), a mixture of compounds of formula (II) and of formula (I) in which the atoms Z and $W_1$ represent N, or a mixture of these additives;
- the silicone polymer P1 has side groups bearing imine functional groups bound to the main chain by their nitrogen atoms and the additive is selected from: a silicone polymer P2 of which the side groups bear imine functional groups bound to the main chain by their carbon atoms, a silicone polymer P2 of which the side groups bear aldehyde functional groups, a silicone polymer P2 comprising side groups bearing aldehyde functional groups and side groups bearing imine functional groups bound to the polymer by the carbon atom, a compound of formula (I) in which the atoms Z and $W_1$ represent C, or a mixture of these additives;
- the silicone polymer P1 has side groups bearing aldehyde functional groups and the additive is selected from: a silicone polymer P2 having side groups bearing imine functional groups bound to the main chain by their nitrogen atoms, a silicone polymer P2 comprising side groups bearing primary amine functional groups and side groups bearing imine functional groups bound to the polymer by the nitrogen atom, a compound of formula (I) in which the atoms Z and $W_1$ represent N or a mixture of these additives;

the silicone polymer P1 has side groups bearing primary amine functional groups and the additive is a silicone polymer P2 comprising side groups bearing imine functional groups bound to the polymer by the carbon atom, a silicone polymer P2 comprising side groups bearing aldehyde functional groups and side groups bearing imine functional groups bound to the polymer by the carbon atom, a compound of formula (I) in which the atoms Z and $W_1$ represent C and, Y and one $W_{2i}$ at least represents N, the other $W_{2i}$ represents, each independently of each other, N or O where appropriate, or a mixture of these additives;

the silicone polymer P1 has side groups bearing aldehyde functional groups and side groups bearing imine functional groups bound to the main chain by their carbon atoms and the additive is a silicone polymer P2 comprising side groups bearing primary amine functional groups, a silicone polymer P2 comprising side groups bearing imine functional groups bound to the polymer by the nitrogen atom, a silicone polymer P2 comprising side groups bearing primary amine functional groups and side groups bearing imine functional groups bound to the polymer by the nitrogen atom, a compound of formula (I) in which the atoms Z and $W_1$ represent N, a compound of formula II, a mixture of compounds of formula (II) and of formula (I) in which the atoms Z and $W_1$ represent N or a mixture of these additives;

the silicone polymer P1 has side groups bearing primary amine functional groups and side groups bearing imine functional groups bound to the main chain by their nitrogen atoms and the additive is a silicone polymer P2 comprising side groups bearing aldehyde functional groups, a silicone polymer P2 comprising side groups bearing imine functional groups bound to the polymer by the carbon atom, a silicone polymer P2 comprising side groups bearing aldehyde functional groups and side groups bearing imine functional groups bound to the polymer by the carbon atom, a compound of formula (I) in which the atoms Z and $W_1$ represent C, or a mixture of these additives.

In a second alternative, the functionalisation and the crosslinking are conducted simultaneously.

In particular, the composition results from the mixing, in the molten state or in solution, of:

At least one linear or branched silicone polymer P1', comprising consecutive —Si—O— units, and comprising functions enabling grafting;

A combination of molecules including molecules comprising at one end a functional group making it possible to bond in a covalent manner the molecule to the polymer P1' and at another end a functional group selected from an imine function bound by its carbon atom (A), an imine function bound by its nitrogen atom (C), an aldehyde function (B), or a primary amine function (E), and/or molecules comprising at two of their ends functional groups making it possible to bond in a covalent manner the molecule to the polymer P1' and between its two ends an imine function (D), the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions;

Advantageously, monofunctional free aldehydes.

Thus, the polymer P1' may be functionalised and crosslinked during the addition of the additive. To do so, the polymer comprises functions enabling grafting, for example in its main chain or on its side/pendant groups.

FIG. 1 presents the molecules being able to be used for polymer functionalisation and crosslinking in one step. The letters $G_1$, $G_2$, $G_3$, $G_4$, $G_5$ and $G_6$ represent a functional group making it possible to bond in a covalent manner the molecules to the polymer chains to functionalise. The functional groups $G_1$, $G_2$, $G_3$, $G_4$, $G_5$ and $G_6$ are chosen as a function of the polymers to functionalise, functions enabling the grafting onto these polymers and the grafting conditions (temperature, reaction medium (molten or in solution), kinetics, use of a catalyst, etc.). Advantageously, the groups $G_1$, $G_2$, $G_3$, $G_4$, $G_5$ and $G_6$ are identical.

As non-limiting examples, the functions G may be thiol functions enabling the functionalisation of the alkene bonds present in the silicone, either in its main chain or as pendant functions, or both in its main chain and as pendant functions. The functions G may also be maleimide, methacrylic, acrylic, styrenic or maleic ester functions in order to enable radical grafting on alkyl or alkene units for example present in the silicone chain and/or as pendant functions (G. Moad, Prog. Polym. Sci. 1999, 24, 81-142; Elisa Passagliaa, Serena Coiai, Sylvain Augier, Prog. Polym. Sci. 2009, 34, 911-947). The functions G may be isocyanate functions that will thus react with the pendant alcohol, amine or thiol groups present on these polymers to functionalise (Kemal Arda Günay, Patrick Theato, Harm-Anton Klok, Journal of Polymer Science Part A: Polymer Chemistry 2013, 51, 1-28; Charles E. Hoyle, Andrew B. Lowe, Christopher N. Bowman, Chem. Soc. Rev., 2010, 39, 1355-1387). The functions G may also be electrophilic olefins being able to give Michael additions with nucleophiles, such as thiols, primary and secondary amines, or phosphines (Brian D. Mather, Kalpana Viswanathan, Kevin M. Miller, Timothy E. Long, Prog. Polym. Sci. 2006, 31, 487-531). Among electrophilic olefins may be cited as non-limiting examples, acrylates, acrylamides, maleimides, methacrylates or vinyl sulphones. The functions G may also be nucleophilic functions, such as alcohols, thiols, amines or carboxylic acids, which can give nucleophilic substitution or ring opening reactions (Kemal Arda Günay, Patrick Theato, Harm-Anton Klok, Journal of Polymer Science Part A: Polymer Chemistry 2013, 51, 1-28). These functional groups may for example open epoxide functions present in the main chain of the polymers, or pendant epoxide functions such as are found in copolymers prepared with glycidyl methacrylate. The functions G may also be alcohol, thiol or amine functions that can react with pendant ester or activated ester functions to give new ester, thioester or amide functions. The functional groups making it possible to bond in a covalent manner the molecule containing the imine or aldehyde or primary amine function to the polymer P1' are thus numerous and varied and those skilled in the art know how to select the functional group of choice as a function of the functions present on the polymer P1' and the grafting conditions (temperature, reaction medium (molten or in solution), kinetics, use of a catalyst, etc.).

FIG. 1 defines the molecules (A) $G_1$-Rx-CH=N—Ry, (B) $G_2$-R'x-CH=O, (C) $G_3$-R''y-N=CH—R''x, (D) $G_4$-R'''x-CH=N—R'''y-$G_5$ and (E) $G_6$-Rw-$NH_2$, where the letters $G_1$, $G_2$, $G_3$, $G_4$, $G_5$ and $G_6$ represent a functional group making it possible to bond in a covalent manner the molecules to the polymer chains to functionalise, Rx, R'x, R''x, R'''x and Ry, R''y, R'''y and Rw are hydrocarbon groups. The denominations "Rx" and "Ry" are reused by homology, without being necessarily identical, with the definition of the pendant imine and aldehyde functional groups according to the invention.

In particular, Rx, R'x, R''x, R'''x each represent, independently of each other, an aliphatic, terpenoid, aromatic, arylaliphatic or cycloaliphatic radical. This radical may contain heteroatoms, in particular selected from O, N, S or Si, and/or may be substituted. Rx, R'x, R''x, R'''x are advantageously an aromatic, heteroaromatic or terpenoid group. Advantageously, when the aldehyde function is borne by a terpenoid group, the aldehyde function is directly bound to an alkene function of the terpenoid. Rx, R'x, R''x, R'''x are bound to the imine or aldehyde functions by a covalent bond via a carbon atom.

In particular, Rx, R'x, R''x, R'''x, each, independently of each other, may be substituted by functional groups, such as ester or amide functions. In particular, this radical is substituted by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical. In particular, this radical Rx, R'x, R''x, may be interrupted by ester, amide, ether, thioether, secondary or tertiary amine, carbonate, urethane, carbamide, anhydride functions.

In particular, Ry, R''y, R'''y each represent, independently of each other, an aliphatic, aromatic, arylaliphatic or cycloaliphatic radical. Ry, R''y, R'''y are bound to the imine functions by a covalent bond via a carbon atom. This radical may contain heteroatoms, in particular selected from O, N, S or Si, and/or may be substituted. In particular, this radical Ry, R''y, R'''y may be substituted by functional groups, such as ester or amide functions. In particular, this radical is substituted by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical. In particular, this radical Ry, R''y, R'''y may be interrupted by ester, amide, ether, thioether, secondary or tertiary amine, carbonate, urethane, carbamide, anhydride functions.

In particular, Rw represents an aliphatic, aromatic, arylaliphatic or cycloaliphatic radical. Rw is bound to the amine functions by a covalent bond via a carbon atom. This radical may contain heteroatoms, in particular selected from O, N, S or Si, and/or may be substituted. In particular, this radical Rw may be substituted by functional groups, such as ester or amide functions. In particular, this radical is substituted by a halogen, a —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, —N(H)—C(O)—Rz group with Rz, R'z, identical or different, representing a $C_1$-$C_{50}$ alkyl radical. In particular, this radical Rw may be interrupted by ester, amide, ether, thioether, secondary or tertiary amine, carbonate, urethane, carbamide, anhydride functions.

FIG. 2 schematically shows the functionalisation of linear polymers P1' by the molecule A, respectively C, via the creation of covalent bonds between the molecules A, respectively C, and the polymer chains.

The combinations enabling crosslinking and functionalisation of polymers in one step are:

- A+C: Polymers functionalised with pendant imine functions coupled by the carbon (A)+polymers functionalised with pendant imine functions coupled by the nitrogen (C) and crosslinking by imine-imine metathesis reaction (FIG. 3). Imine-imine metathesis reactions may take place between A and C before these functions are grafted onto the polymers (which comes down to generating a molecule equivalent to the molecule D).
- B+C: Polymers functionalised with pendant aldehyde functions (B)+polymers functionalised with pendant imine functions coupled by nitrogen (C) and crosslinking by aldehyde-imine exchange reaction. Aldehyde-imine exchange reactions may take place between B and C before these functions are grafted onto the polymers (which comes down to generating a molecule equivalent to the molecule D).
- A+D: Polymers crosslinked by the molecule D+polymers functionalised with pendant imine functions coupled by the carbon (A). Imine-imine metathesis reactions may take place between A and D before these functions are grafted onto the polymers.
- B+D
- C+D
- A+B+C
- A+B+D
- B+C+D
- A+B+C+D
- E+A
- E+D
- A+E+C
- A+E+D
- A+C+D+E
- A+B+C+E
- A+B+D+E
- A+B+C+D+E
- A+C+D
- A+B+E
- B+C+E
- B+C+D+E To summarise, any combination for which on average at least two imine and/or aldehyde functions will be grafted per polymer chain and bound to the main chain by the carbon atom and two imine and/or primary amine functions will be grafted per polymer chain and bound to the main chain by the nitrogen atom.

Monofunctional free aldehydes may be added in addition in each case.

Other combinations are further possible when a compound of formula (I) or of formula (II), defined previously, is used:

- A+compound (I) for which Z and $W_1$ are N. Polymers functionalised with pendant imine functions bound to the main chain by the carbon atom (A) are thus prepared then crosslinking takes place by imine-imine metathesis reaction between the pendant functions and the compound (I). Imine-imine metathesis reactions may take place between A and the compound (I) before these functions are grafted onto the polymers.
- B+compound (I) for which Z and $W_1$ are N
- A+B+compound (I) for which Z and $W_1$ are N
- C+compound (I) for which Z and $W_1$ are C
- E+compound (I) for which Z and $W_1$ are C, Y and one $W_{2i}$ at least are N C+E+compound (I) for which Z and $W_1$ are C
A+compound (II)
A+B+compound (II)

Once again, it is necessary that there are on average at least two grafted exchangeable pendant functions per polymer chain (via A, B, C or E). The quantity of compound (I) will vary depending on its functionality. However, it may be said that the compounds (I) also have to provide on average at least two imine or aldehyde functions per polymer chain. These functions have to be complementary to the functions grafted onto the polymers (via A, B, C or E).

Monofunctional free aldehydes may be added in addition in each case.

In the compositions according to the invention, the polymers include pendant imine and/or aldehyde and/or primary amine functions. They also include imine functions in their side chains forming crosslinking points. This enables an exchange between imines and improves the crosslinking of the polymers. The inventors think that the exchange reactions between imines and between imines and aldehydes and between imines and primary amines enable a circulation of crosslinking points.

The compositions also include monofunctional free aldehydes and/or monofunctional free imines and/or monofunctional free primary amines, formed during the creation of the crosslinking points.

To one or the other of these compositions described previously, it is further possible to add a compound having a single imine or aldehyde or primary amine function. This additional compound may make it possible to modulate the properties, notably the viscosity, of the polymer compositions. This compound may comprise an aryl, or heteroaryl, or terpenoid group bound to the carbon of the aldehyde or the imine or the primary amine. Advantageously, when the aldehyde function is borne by a terpenoid group, the aldehyde function is directly bound to an alkene function of the terpenoid.

Moreover, the compositions according to the invention advantageously include monofunctional free aldehydes. In a surprising manner, the inventors have discovered that the exchange reactions between imines may be catalysed by an aldehyde, which may be present in the polymer (pendant CHO group) or as a molecule not bound to the polymers, designated "free". The monofunctional free aldehyde may be added before, during or after the addition of the additive.

The aldehyde function may be borne by a molecule comprising at least one CHO group: additive of formula (I) and/or additive P2 and/or monofunctional free aldehyde. Advantageously, in the presence of a molecule, the aldehyde functionalised molecule used to catalyse the metathesis of imines is an aromatic aldehyde, namely a molecule for which the aldehyde function is borne by an aryl or heteroaryl group, preferably a benzene ring. Benzaldehyde and derivatives thereof may notably be cited. Advantageously, the aldehyde functionalised molecule used to catalyse the metathesis of imines is a molecule in which the carbon of the aldehyde function is bound by a covalent bond to an alkene function of a terpenoid. Citral, its two isomers, geranial and neral, and derivatives thereof may notably be cited.

In a surprising manner, the inventors have discovered that the imine and aldehyde functions can exchange their substituents according to the following reaction:

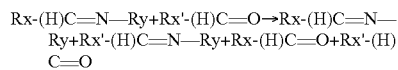

Advantageously, the carbon atom of the imine functions and the carbon atom of the aldehyde functions are directly bound to a carbon atom of an aryl, heteroaryl group or to the alkene function of a terpenoid.

The use of aldehyde functionalised molecules, and more particularly aromatic aldehydes, such as benzaldehyde and derivatives thereof, notably vanillin, and terpenoid aldehydes, such as cinnamaldehyde, as catalysts for the metathesis of imines has numerous advantages. These molecules are compatible with numerous polymers, these molecules are not very likely to introduce parasitic reactions in the polymer matrices/materials, these molecules are commercially available, may be bio-sourced or sourced from natural origins and numerous aromatic aldehydes and terpenoid aldehydes are barely or not toxic as shown by their use in the food industry and cosmetics.

As illustrated in the examples below, the presence of a pendant or free aldehyde is going to catalyse the imine-imine metathesis and imine-aldehyde exchange reactions.

The silicone polymers may be functionalised to introduce imine or aldehyde or primary amine functionalised pendant side groups or to introduce units or functions enabling grafting. The introduction of these imine or aldehyde or primary amine functionalised pendant side groups can be done by different methods known to those skilled in the art: copolymerisation of precursor monomers of the polymer with functionalised imine or aldehyde or primary amine monomers (the imine or aldehyde or primary amine functions not being integrated in the main chain of the polymer in the course of formation but located on a pendant side group) (M. Spinu, J. E. Mc Grath, J. Polym. Sci. Part A Polym. Chem. 1991, 29, 657), grafting on a reactive function of the polymer, copolymerisation of precursor monomers of the polymer with monomers containing one or more functions that will serve after formation of the polymer to graft pendant imine and/or aldehyde and/or primary amine functions (W. Noli, Chemistry and Technology of Silicones. Academiv Press, New York, 1968). Such methods are known to those skilled in the art and the synthesis of silicone copolymers with pendant functions is notably described in chapter 3 "Side Group Modified" (authors: B. Boutevin, F. Guida-Pietrasanta and A. Ratsimihety) of the book "Silicon-Containing Polymers" (Ed. R. G. Jones, W. Ando, J. Chojnowski, Springer, 2000). One method commonly used for the introduction of pendant functions onto silicones is the hydrosilylation reaction. This reaction corresponds to the addition of an unsaturated compound on a Si—H bond. Numerous silicones containing hydrosilane functions, including polymethylhydrosiloxane (PMHS) and poly(dimethylsiloxane-co-methylhydrosiloxane) (PDMSMHS) copolymers, are commercially available (Gelest, Dow, Siltech, ShinEtsu, Wacker, etc.). The hydrosilylation reaction takes place either in the presence of radical initiators, or in the presence of catalysts. Among catalysts for the hydrosilylation reaction may be cited tertiary amines, Lewis acids and transition metal complexes, notably complexes of platinum (J. V. Crivello, J. L. Lee, J Polym. Sci., Part A, Polym. Chem., 1990, 28, 479; J. N. Lewis, J. Amer. Chem. Soc. 1991, 112, 5998; J. V. Crivelto, D. Bi, J Polym. Sci., Part A, Polym. Chem., 1993, 31, 3121). The hydrosilylation reaction notably makes it possible to prepare silicones containing pendant amine, imine functions (J. V. Crivello, G. Lohden, Macromolecules, 1995, 28, 8057), epoxy functions (L. Lecamp, C. Vaugelade, B. Youssef, C. Bunel, Eur. Polym. J., 1997, 33, 1453; J. V. Crivello, M. Fan, J Polym Sci., Part A. Polym Chem., 1991, 29, 1853; J. V. Crivello, Bo Yang, Whan-Gi Kim, J Polym. Sci., Part A. Polym. Chem., 1995, 33, 2415), acrylate and methacrylate functions (K. D. Belfield, X. Z. Lin, I. Cabasso, J Polym. Sci. Part A Polym. Chem. 1991, 29, 1073; R. Puyenbroek, J. J. Jansema, J. C. Van de Grampel, B. A. C. Rousseeuw, E. W. J. M. Van der Drift, Polymer 1996, 37, 847). Thiolene addition is another approach commonly used to functionalise silicones. It involves the addition of a thiol compound on a pendant vinyl bond of a silicone. Numerous silicones containing vinylsilane functions, notably polymethylhvinylsiloxane (PMVS) and poly(dimethylsiloxane-co-methylhvinylsiloxane) (PDMSMVS) copolymers, are commercially available (Gelest, Dow, Siltech, ShinEtsu, Wacker, etc.). Thiolene addition on silicones containing vinylsilane functions notably make it possible to prepare silicones containing pendant primary amine, imine, aldehyde functions. The introduction of units or functions enabling grafting may also be done according to other methods known to those skilled in the art (Charles E. Hoyle, Christopher N. Bowman, Angew. Chem. Int. Ed. 2010, 49, 1540-1573; Kemal Arda Günay, Patrick Theato, Harm-Anton Klok, Journal of Polymer Science Part A: Polymer Chemistry 2013, 51, 1-28; G. Moad, Prog. Polym. Sci. 1999, 24, 81-142; Elisa Passagliaa, Serena Coiai, Sylvain Augier, Prog. Polym. Sci. 2009, 34, 911-947; Charles E. Hoyle, Andrew B. Lowe, Christopher N. Bowman, Chem. Soc. Rev., 2010, 39, 1355-1387; Brian D. Mather, Kalpana Viswanathan, Kevin M. Miller, Timothy E. Long, Prog. Polym. Sci. 2006, 31, 487-531; T. C. Chung, Prog. Polym. Sci. 2002, 27, 39-85. Chulsung Bae, John F. Hartwig, Hoyong Chung, Nicole K. Harris, Karen A. Switek, Marc A. Hillmyer, Angew. Chem. Int. Ed. 2005, 44, 6410-6413).

As described previously, the polymers may be functionalised and crosslinked during the addition of the additive.

The number average molar mass, $M_n$, of the linear or branched polymers P1, P1', or P2, that is to say before crosslinking, advantageously varies from 1000 g/mol to 2500000 g/mol, more advantageously from 2000 to 750000 g/mol and even more advantageously from 7500 g/mol to 400000 g/mol.

The dispersity, $D=M_w/M_n$, of the linear or branched polymers P1, P1', or P2, that is to say before crosslinking, varies advantageously from 1.01 to 15, more advantageously from 1.03 to 10 and even more advantageously from 1.05 to 7.5.

In the invention, the molar ratio [repeating unit of the polymer P1 or P1' not containing pendant imine or aldehyde or primary amine functions]:[repeating unit of the polymer P1 or P1' containing a pendant imine function+repeating unit of the polymer P1 or P1' containing a pendant aldehyde function+repeating unit of the polymer P1 or P1' containing a pendant primary amine function] advantageously varies from 0.01 to 1000, more advantageously from 0.1 to 250 and even more advantageously from 1 to 100. "Pendant imine or aldehyde or primary amine function" here designates either an imine or aldehyde or primary amine function or a function enabling the grafting of such an imine or aldehyde or primary amine function.

The molar ratio [compound of formula (I)]:[repeating unit of the polymer P1 or P1' containing a pendant imine function+repeating unit of the polymer P1 or P1' containing a pendant aldehyde function+repeating unit of the polymer P1 or P1' containing a pendant primary amine function] advantageously varies from 5 to 0.001 more advantageously from 1 to 0.005 and even more advantageously from 0.5 to 0.01. "Pendant imine or aldehyde or primary amine function" here designates either an imine or aldehyde or primary amine function or a function enabling the grafting of such an imine or aldehyde or primary amine function.

In the invention, the molar ratio [repeating unit of the polymer P2 not containing pendant imine or aldehyde or primary amine functions]:[repeating unit of the polymer P2 containing a pendant imine function+repeating unit of the polymer P2 containing a pendant aldehyde function+repeating unit of the polymer P2 containing a pendant primary amine function] advantageously varies from 0.01 to 1000, more advantageously from 0.1 to 250 and even more advantageously from 1 to 100.

The molar ratio [repeating unit of the polymer P2 containing a pendant imine function+repeating unit of the polymer P2 containing a pendant aldehyde function+repeating unit of the polymer P2 containing a pendant primary amine function]:[repeating unit of the polymer P1 or P1' containing a pendant imine function+repeating unit of the polymer P1 or P1' containing a pendant aldehyde function+repeating unit of the polymer P1 or P1' containing a pendant primary amine function] advantageously varies from 2500 to 0.0004, more advantageously from 250 to 0.004 and even more advantageously from 100 to 0.01. "Pendant imine or aldehyde or primary amine function" here designates either an imine or aldehyde or primary amine function or a function enabling the grafting of such an imine or aldehyde or primary amine function.

When they are in the form of liquid formulations, the compositions of crosslinked polymers according to the invention, advantageously the compositions forming a network of crosslinked linear or branched polymers, advantageously have the remarkable property of being able to be injected, notably via a syringe. Depending on the level of crosslinking of the networks of crosslinked linear or branched polymers, the compositions of crosslinked polymers according to the invention are injectable, notably via a syringe, while forming a network of crosslinked polymers which, swollen by solvent(s), advantageously water, will be able to supports its own weight and will not flow at the scale of 30 seconds, advantageously 1 minute, advantageously 2 minutes, advantageously 5 minutes, advantageously 10 minutes, advantageously 30 minutes, advantageously 1 hour, advantageously 2 hours, advantageously 4 hours, advantageously 6 hours, advantageously 8 hours, advantageously 12 hours, advantageously 1 day, without the application of a stress.

When they are in the form of liquid formulations, the networks of linear or branched crosslinked polymers according to the invention advantageously have the property of agglomerating together when they are left in contact.

The crosslinking rate of the compositions of crosslinked polymers according to the invention, advantageously the compositions in the form of liquid formulations forming networks of linear or branched crosslinked polymers, may be modulated by addition to the composition of monofunctional free aldehydes, and/or monofunctional free imines, and/or monofunctional free primary amines and/or compounds of formulas (I) and/or (II) and/or linear or branched polymers P2. Such a modulation of the level of crosslinking can make it possible to release molecules and/or polymers into the formulations containing the compositions of crosslinked polymers according to the invention. Active ingredients, proteins, nucleic acids, amino acids, vitamins, aromas, catalysts, chemical reagents, pigments or other additives may be cited as non-restrictive examples of molecules or polymers being able to be released.

The composition of the invention may further comprise fillers and/or additives. The fillers and/or the additives are in particular those normally used by those skilled in the art.

The composition may further comprise, in the mixture or in the network, other compatible polymer(s). Those skilled in the art know how to choose such a polymer.

Compositions of polymer networks comprising at least one polymer network of which the composition has been described above may also comprise: one or more polymers, pigments, colorants, brightening agents, fillers, plastifiers, impact modifiers, fibres, flame retarders, antioxidants, lubricants, wood, glass, metals.

Among the polymers that may be used in mixture with the polymer compositions or networks of the invention may be cited elastomers, thermosettings, thermoplastic elastomers, impact resistant polymers.

The term "pigments" signifies coloured particles insoluble in the polymer composition or the network. Among pigments that may be used in the invention may be cited titanium oxide, carbon black, carbon nanotubes, metal particles, silica, metal oxides, metal sulphites or any other mineral pigment. As pigments may also be cited phthalocyanines, anthraquinones, quinacridones, dioxazines, azoic pigments or any other organic pigment, natural pigments (madder, inidigo, garance, carmin, etc.) and mixtures of pigments. The pigments may represent between 0.05% and 70% by weight of the composition of the formulation.

The term "colorants" signifies molecules that are soluble in the polymer composition or network and which have the capacity of absorbing all or part of visible light radiation.

The term "brightening agent" signifies a molecule which absorbs ultraviolet light radiation and next re-emits this energy by fluorescence in the visible. Brightening agents are notably used to impart a certain whiteness.

Among "fillers" that may be used in the polymer compositions or networks of the invention may be cited silica, clays, calcium carbonate, carbon black, kaolins.

Among fibres that may be used in the polymer compositions or networks of the invention may be cited glass fibres, carbon fibres, polyester fibres, polyamide fibres, aramid fibres, polyethylene fibres, cellulose and nano-cellulose fibres. Plant fibres (linen, hemp, sisal, bamboo, etc.) may also be envisaged.

The presence in the polymer compositions or networks of the invention of heat conducting pigments, colorants or fibres may be used to facilitate the heating of an article obtained from the polymer compositions or networks of the invention and thereby enable the manufacture, the transformation or the recycling of an article obtained from polymer compositions or networks of the invention as described below. As non-limiting examples of heat conducting pigments, fibres or "fillers" may be cited aluminium nitride (AlN), boron nitride (BN), $MgSiN_2$, silicon carbide (SiC), graphite, graphene, carbon nanotubes, carbon fibres, metal powders and combinations thereof.

The presence in the polymer compositions or networks of the invention of pigments, colorants or fibres capable of absorbing radiation may be used to ensure the heating of an article obtained from the polymer compositions or networks of the invention by means of a radiation source, such as a laser for example. The presence in the polymer compositions or networks of the invention of electro-conductive pigments, fibres or "fillers" such as carbon black, carbon nanotubes, carbon fibres, metal powders, magnetic particles may be used to ensure the heating of an article obtained from polymer compositions or networks of the invention by Joule effect, by induction or by microwaves. Such heating methods can enable the manufacture, the transformation or the recycling of an article obtained from polymer compositions or networks of the invention as described below. Electro-conductive fillers may also make it possible to evacuate electrostatic charges from the material or to enable electrostatic painting.

The invention also relates to a method for preparing compositions according to the invention. This method advantageously comprises the following steps:

Choosing a linear or branched silicone polymer, comprising consecutive —Si—O— units P1 having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom;

Choosing at least one additive bearing at least two imine and/or aldehyde and/or primary amine functional groups able to react with the side groups of the polymer P1 to form a composition of crosslinked polymers, advantageously a crosslinked network, containing exchangeable pendant bonds and exchangeable crosslinking points that are exchangeable by aldehyde-imine exchange reactions and/or by imine-imine exchange reactions and/or by imine-primary amine exchange reactions;

mixing, in the molten state or in solution, said polymer P1, said additive and where appropriate a monofunctional free aldehyde, to obtain said composition.

The choice of the substitutions and the additive is made according to the description given previously for the compositions. It is possible to add a monofunctional free aldehyde or a monofunctional free imine or a monofunctional free primary amine, as described previously.

The method may comprise a prior step of preparing a polymer P1, comprising the copolymerisation, by ring opening polymerisation or by polycondensation, of a precursor monomer of P1 and of a monomer bearing an imine or aldehyde or primary amine functional group.

The method may comprise a prior step of preparing a polymer P1, comprising the grafting of pendant aldehyde and/or imine and/or primary amine functions onto a linear or branched polymer.

Another method according to the invention advantageously comprises the following steps:

choosing at least one linear or branched silicone polymer, comprising consecutive —Si—O— units P1' comprising functions enabling grafting,
choosing a combination of molecules including molecules comprising at one end a functional group making it possible to bond in a covalent manner the molecule to the polymer P1' and at another end a functional group selected from an imine function bound by its carbon atom to the remainder of the molecule (A), an imine function bound by its nitrogen atom to the remainder of the molecule (C), or an aldehyde function (B), or a primary amine function (E) and/or molecules comprising at two of their ends functional groups making it possible to bond in a covalent manner the molecule to the polymer P1' and between its two ends an imine function (D), the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions;

mixing, in the molten state or in solution, said polymer P1', said combination and where appropriate a monofunctional free aldehyde, to obtain said composition.

The choice of the substitutions and the combination is made according to the description given previously for the compositions. A monofunctional free aldehyde or a monofunctional free imine, or a monofunctional free primary amine may be added, as described previously.

The method may comprise a prior step of preparing a polymer P1', comprising the copolymerisation, by ring opening polymerisation or by polycondensation, of a precursor monomer of P1' and a monomer bearing a functional group making it possible thereafter to graft pendant aldehyde and/or imine and/or primary amine functions.

The method may comprise a prior step of preparing a polymer P1', comprising the grafting of pendant functions enabling the grafting of aldehyde and/or imine and/or primary amine functions on a linear or branched polymer.

The invention also relates to a material obtained from the composition according to the invention.

The invention also relates to a method for preparing a material according to the invention, comprising the following steps:

Preparing a composition according to the invention;

Shaping the composition thereby obtained.

The notion of shaping includes not just the compounding of the composition in the form of granules or powder for example but also the preparation of finished products. The shaping may be carried out by methods known to those skilled in the art for the shaping of thermoplastic or thermosetting polymers. Moulding, compression, injection, extrusion, thermoforming methods may notably be mentioned. Before giving it the shape of the desired object, the material will be the most often in the form of granules or powder.

Interestingly, in the method according to the invention, the steps of preparation and shaping may be concomitant. In particular, by the methods described previously, it is possible to functionalise and crosslink a polymer for example by extrusion or injection during its shaping or a step of compounding.

The invention also relates to a formulation comprising a composition according to the invention.

The invention also relates to the use of an additive as defined previously or a combination as defined previously, in the presence of a linear or branched polymer P1 or P1' for the formation of a composition of crosslinked polymers, advantageously a crosslinked network, containing exchangeable pendant bonds and exchangeable crosslinking points that are exchangeable by aldehyde-imine exchange reactions and/or by imine-imine exchange reactions and/or by imine-primary amine exchange reactions. The nature of the additive or the combination is chosen as a function of the polymer P1 or P1', in particular its functionalisation, according to the criteria explained previously.

It is further possible to add to the composition a monofunctional free aldehyde or a monofunctional free imine or a monofunctional free primary amine. Advantageously, the carbon atom of the imine function and the carbon atom of the aldehyde function is directly bound to an aryl or heteroaryl group.

Advantageously, the carbon atom of the imine function and the carbon atom of the aldehyde function is directly bound to the alkene function of a terpenoid group.

The compositions according to the invention may serve for any use of silicones described in the introduction. In particular, the compositions according to the invention may be used to prepare patches, dressings, "pressure sensitive" adhesives or "sensitive skin" adhesives. Similarly, depending on the degree of crosslinking, it is possible to obtain compositions according to the invention which may be used in non-stick coatings.

The invention also relates to a method for modifying the rheology of a composition, such as an oil or a paint or a cosmetic composition, comprising said polymer P1 or P1' by addition to the composition of the additive according to the invention or the combination according to the invention. The rheology is modified by choosing the concentration of said additive or combination.

The nature of the additive or the combination is chosen as a function of the polymer P1 or P1', in particular its functionalisation, according to the criteria explained previously.

It is further possible to add to the composition a monofunctional free aldehyde or a monofunctional free imine or a monofunctional free primary amine. Advantageously, the carbon atom of the imine function and the carbon atom of the aldehyde function is directly bound to an aryl or heteroaryl group.

Advantageously, the carbon atom of the imine function and the carbon atom of the aldehyde function is directly bound to the alkene function of a terpenoid group.

The invention also relates to combinations for crosslinking linear or branched silicone polymers, comprising consecutive —Si—O— units, advantageously P1, P1', said combinations being selected from combinations comprising:

A monofunctional free aldehyde+compound of formula (I), as defined previously;

Compound of formula (II)+compound of formula (I)) in which Z represents N and $W_1$ represents N, as defined previously;

A monofunctional free aldehyde+silicone polymer P2, as defined previously;

A and/or B+C; A, B, C being as defined previously, and optionally a monofunctional free aldehyde as defined previously;

A, optionally B, +C and/or E, and optionally a monofunctional free aldehyde, as defined previously;

A and/or B and/or C+D and/or E, and optionally a monofunctional free aldehyde as defined previously;

A and/or B+compound of formula (I) for which Z and $W_1$ are N, and optionally a monofunctional free aldehyde, as defined previously; or A, optionally B, +compound of formula (II) and optionally a monofunctional free aldehyde, as defined previously;

C and/or E+compound of formula (I) for which Z and $W_1$ are a carbon atom, and optionally a monofunctional free aldehyde, as defined previously.

In the first three cases, it is necessary that the linear or branched polymers have exchangeable pendant imine and/or aldehyde and/or primary amine functions.

A, B, C, D, E are as described previously.

These combinations may also comprise a monofunctional free aldehyde or a monofunctional free imine or a monofunctional free primary amine. Advantageously, the carbon atom of the imine function and the carbon atom of the aldehyde function are directly bound to a terpenoid, aryl or heteroaryl group. Advantageously, when the aldehyde function is borne by a terpenoid group, the aldehyde function is directly bound to an alkene function of the terpenoid.

The present invention also relates to the use of a combination such as previously, in the presence of a linear or branched silicone polymer, comprising consecutive —Si—O— units P1 or P1' for the formation of a composition comprising crosslinked polymers, advantageously a crosslinked silicone network, containing exchangeable pendant bonds and exchangeable crosslinking points that are exchangeable by aldehyde-imine exchange reactions and/or by imine-imine exchange reactions and/or by imine-primary amine exchange reactions and monofunctional free aldehydes and/or monofunctional free imines and/or monofunctional free primary amines, in particular to modify the rheology of a composition, such as an oil, a paint or a cosmetic formulation, comprising said polymer P1 or P1' by addition to the composition of the combination according to the invention; the rheology could be modified by choosing the concentration of said combination.

The following examples illustrate the invention and are not limiting.

A. Synthesis of Functionalising Agents A, B, C and D and of Compounds of Formula (I)

A.1. Functionalising Agent B: B1

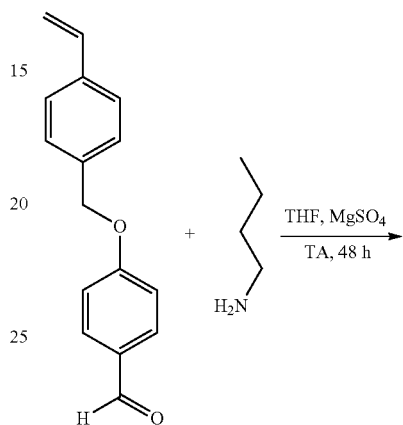

p-chloromethylstyrene (6.63 g, 43.4 mmol), 4-hydroxybenzaldehyde (6.25 g, 51.1 mmol) and potassium carbonate ($K_2CO_3$) (17.7 g, 127.9 mmol) are introduced into a 250 mL round bottom flask containing 75 mL of dimethylformamide (DMF). The mixture is left under stirring under nitrogen atmosphere for 3 hours at 70° C. The solution is next poured into 500 mL of water, and the mixture is extracted three times with 150 mL of ethyl acetate. The organic phases are combined, washed three times with 150 mL of 0.5 M aqueous solution of sodium hydroxide, then dried over magnesium sulphate ($MgSO_4$). The solvent is next evaporated to give a slightly yellow solid. The solid is introduced into 100 mL of heptane and the mixture is heated for 1 hour at 50° C. under strong stirring. The solid is next filtered and dried to give the functionalising agent B B1 in the form of a white solid (8.7 g, 36.3 mmol, 84%).

$^1$H NMR (CDCl$_3$, 400 MHz) δ: 9.89 (s, 1H), 7.84 (d, 2H, J=8.8 Hz), 7.42 (m, 4H), 7.07 (d, 1H, J=8.8 Hz), 6.73 (dd, 1H, J=17.6 Hz, 10.8 Hz), 5.77 (d, 1H, J=17.6 Hz), 5.28 (d, 1H, J=10.8 Hz), 5.14 (s, 2H).

GC MS: 97%, ( ) [M] Calculated for C16H14O2: 238.0944; Found: 238.20

A.2. Functionalising Agent A: A1

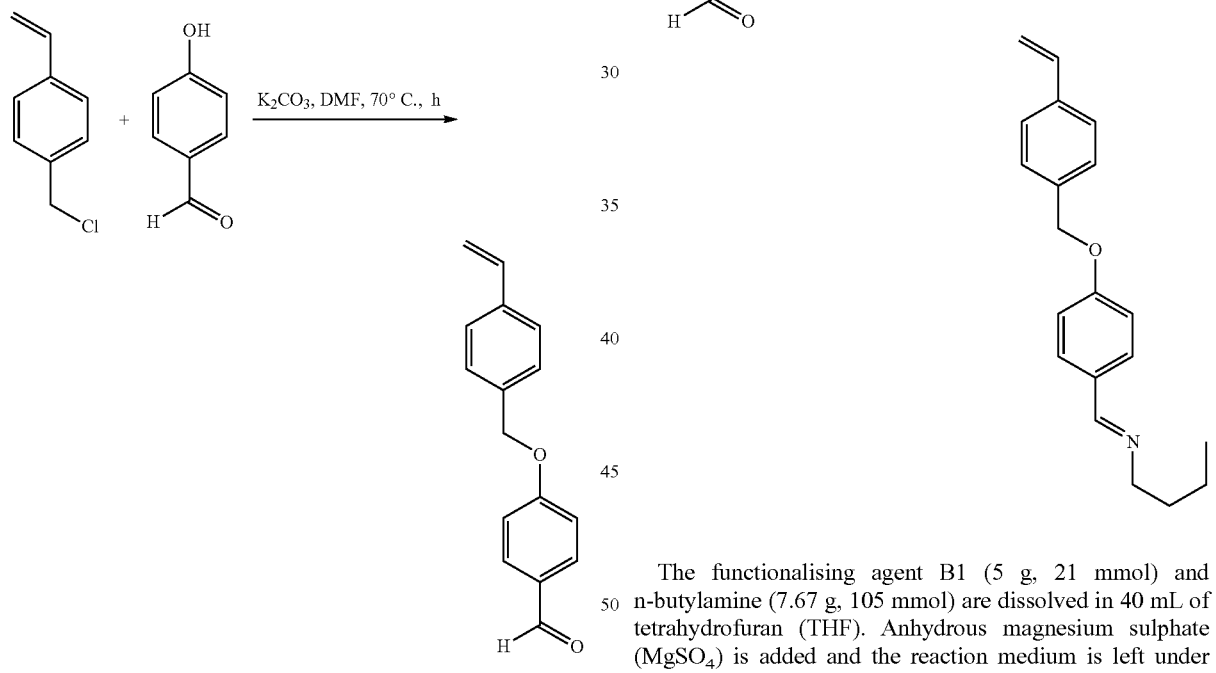

The functionalising agent B1 (5 g, 21 mmol) and n-butylamine (7.67 g, 105 mmol) are dissolved in 40 mL of tetrahydrofuran (THF). Anhydrous magnesium sulphate ($MgSO_4$) is added and the reaction medium is left under stirring for 48 hours at room temperature (RT or TA). The mixture is next filtered and concentrated under reduced pressure for the functionalising agent A A1 in the form of a white solid (5.85 g, 19.9 mmol, 95%).

$^1$H NMR (CDCl$_3$, 400 MHz) δ: 8.20 (s, 1H), 7.66 (d, 2H, J=8.8 Hz), 7.41 (m, 4H), 6.99 (d, 2H, J=8.8 Hz), 6.73 (dd, 1H, J=17.6 Hz, 10.8 Hz), 5.77 (d, 1H, J=17.6 Hz), 5.27 (d, 1H, J=10.8 Hz), 5.09 (s, 2H), 3.58 (t, 2H, J=7.2 Hz), 1.67 (m, 2H), 1.38 (m, 2H), 0.95 (t, 3H, J=7.2 Hz).

$^{13}$C NMR (CDCl$_3$, 400 MHz) δ: 160.5, 160.0, 137.4, 136.4, 136.2, 129.6, 129.5, 127.8, 126.5, 114.9, 114.2, 69.8, 61.4, 32.2, 20.5, 14.0

GC MS: 96%, ( ) m/z: [M] Calculated for C$_{20}$H$_{30}$ NO 293.4027; Found 293.25

A.3. Compound of Formula (I) and/or Functionalising Agent D: CF1

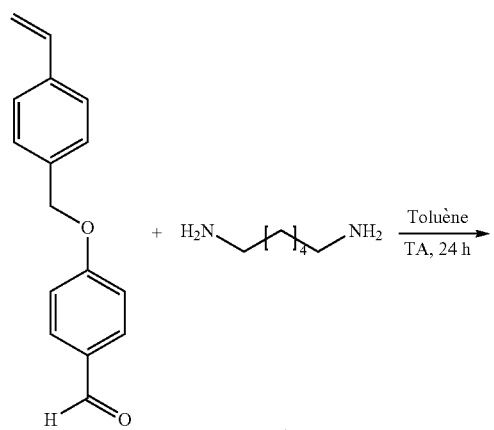

The compound aldehyde M1 (12.0 g, 50.34 mmol) and hexane-1,6-diamine (5.83 g, 50.34 mmol) are dissolved in 150 mL of toluene and the reaction mixture is left under stirring at room temperature for 24 hours, during which a white precipitate is formed. The mixture is filtered and the precipitate is rinsed three times with 150 mL of methanol. The precipitate is next filtered, rinsed three times with 150 mL of methanol and dried to give the compound of formula (I) and/or the functionalising agent D CF1 in the form of a white solid (9.5 g, 17.1 mmol, 70%).

$^1$H NMR (CDCl$_3$, 400 MHz) δ: 8.19 (s, 2H), 7.66 (d, 4H, J=8.8 Hz), 7.41 (m, 8H), 6.99 (d, 4H, J=8.8 Hz), 6.73 (dd, 2H, J=17.6 Hz, 10.8 Hz), 5.77 (d, 2H, J=17.6 Hz), 5.27 (d, 2H, J=10.8 Hz), 5.08 (s, 4H), 3.57 (t, 4H, J=7.2 Hz), 1.70 (m, 4H), 1.41 (m, 4H).

$^{13}$C NMR (CDCl$_3$, 400 MHz) δ: 160.7, 160.1, 137.5, 136.4, 136.2, 129.6, 127.7, 126.5, 114.9, 114.3, 69.8, 61.7, 31.0, 27.2.

A.4. Compound of Formula (I): CF2

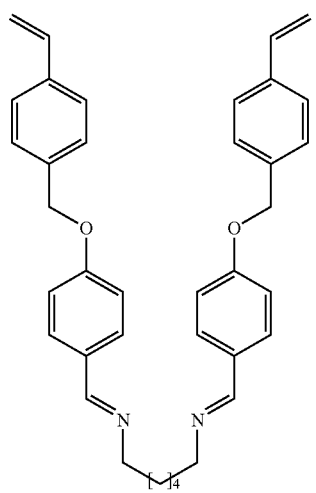

Benzaldehyde (2.05 equivalent) and hexane-1,6-diamine (1 equivalent) are introduced into dichloromethane (2 mL per mol of hexane-1,6-diamine) and magnesium sulphate is added (3 equivalents). The reaction mixture is left under stirring at room temperature for 24 hours, filtered then evaporated under reduced pressure to give the compound of formula (I) CF2 in the form of a yellow oil (98%, in the presence of 7 mol % of benzaldehyde).

$^1$H NMR (CDCl$_3$, 400 MHz) δ: 8.26 (s, 1H), 7.72 (m, 2H), 7.38 (m, 3H), 3.63 (t, J=6.8 Hz, 2H), 1.74 (m, 2H), 1.42 (m, 2H).

$^{13}$C NMR (CDCl$_3$, 400 MHz) δ: 161.2, 136.2, 130.4, 128.6, 128.1, 62.0, 30.8, 27.2.

A.5. Compound of Formula (I): CF3

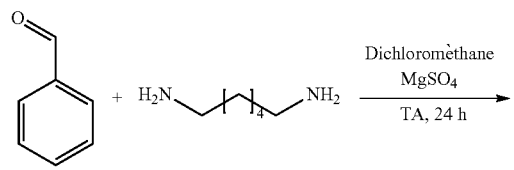

1.5 g of terephthaldehyde (1 eq.) and 3 g of octylamine (2.1 eq.) are solubilised in 5 mL of anhydrous THF. 8 g of anhydrous magnesium sulphate (6 eq.) are added. The mixture is placed under stirring at room temperature. After 12 h, the suspension is filtered on filter paper and the THF evaporated under reduced pressure to give the compound of formula (I) CF3 in the form of a pale yellow solid (quantitative reaction).

$^1$H NMR (CDCl$_3$, 400 MHz) δ: 8.28 (s, 2H), 7.76 (s, 4H), 3.61 (t, J=7.1 Hz, 4H), 1.70 (qt, J=7.1 Hz, 4H), 1.27 (m, 20H), 0.87 (t, J=7.1 Hz, 6H).

A.6. Functionalising Agent C: C1

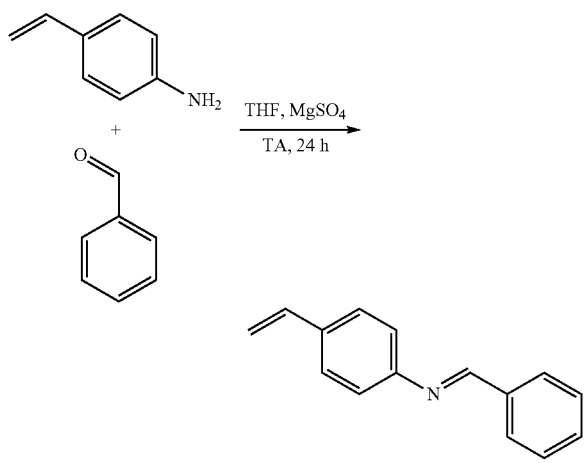

Benzaldehyde (0.9 mL, 8.8 mmol) and 4-vinylaniline (1 g, 8.4 mmol), or functionalising agent E E1, are introduced into 20 mL of tetrahydrofuran and magnesium sulphate (1 g) is added. The reaction mixture is left under stirring at room temperature for 24 hours, filtered then evaporated under reduced pressure to give the functionalising agent C C1 (90%, in the presence of 5 mol % of benzaldehyde).

$^1$H NMR (CDCl$_3$, 400 MHz) δ: 8.48 (s, 1H), 7.93-7.90 (m, 2H), 7.50-7.45 (m, 5H), 7.23-7.20 (m, 2H), 6.75 (dd, J=17.6 Hz, 10.8 Hz, 1H), 5.76 (d, J=17.6 Hz, 1H), 5.25 (d, J=10.8 Hz, 1H).

A.7. Functionalising Agent C: C2

Benzaldehyde (0.24 mL, 2.4 mmol) and 4-vinylbenzylamine (0.3 g, 2.25 mmol)), or functionalising agent E E2, are introduced into 10 mL of tetrahydrofuran and magnesium sulphate (0.5 g) is added. The reaction mixture is left under stirring at room temperature for 24 hours, filtered then evaporated under reduced pressure to give the functionalising agent C C2 (90%, in the presence of 5 mol % of benzaldehyde).

$^1$H NMR (CDCl$_3$, 400 MHz) δ: 8.40 (s, 1H), 7.81-7.78 (m, 2H), 7.44-7.31 (m, 7H), 6.73 (dd, J=17.6 Hz, 10.8 Hz, 1H), 5.74 (d, J=17.6 Hz, 1H), 5.25 (d, J=10.8 Hz, 1H), 4.83 (s, 2H).

B. Kinetic Studies of Exchange Reactions

These experiments aim to evaluate the conditions (time, temperature, catalyst) making it possible to observe the imine-imine, imine-amine and imine-aldehyde exchange reactions.

Kinetic Studies:

Stoichiometric quantities of the imine, amine or aldehyde compounds are mixed in CDCl$_3$ and $^1$H NMR spectra are recorded regularly. The compounds are mixed from mother solutions and the overall concentration of the two starting reagents that can exchange is set at 0.071 mol/L (0.05 mmol/0.7 mL).

General Mixing Procedure:

CDCl$_3$ is introduced into the NMR tube and the reagents are added by means of a micro-syringe from mother solutions. The tube is hermetically sealed and gently stirred before starting the NMR analysis. The time passed between the end of introduction of all the reagents and the acquisition of the first NMR spectrum is around 3:30 minutes. For analyses at high temperatures, the NMR spectrometer is equilibrated beforehand at the analysis temperature. The room temperature for these analyses was comprised between 22.0 and 23.6° C. The following exchange reactions were studied:

Reaction scheme of the imine-imine metathesis reactions B.1, B.2, B.3, B.4, B.5

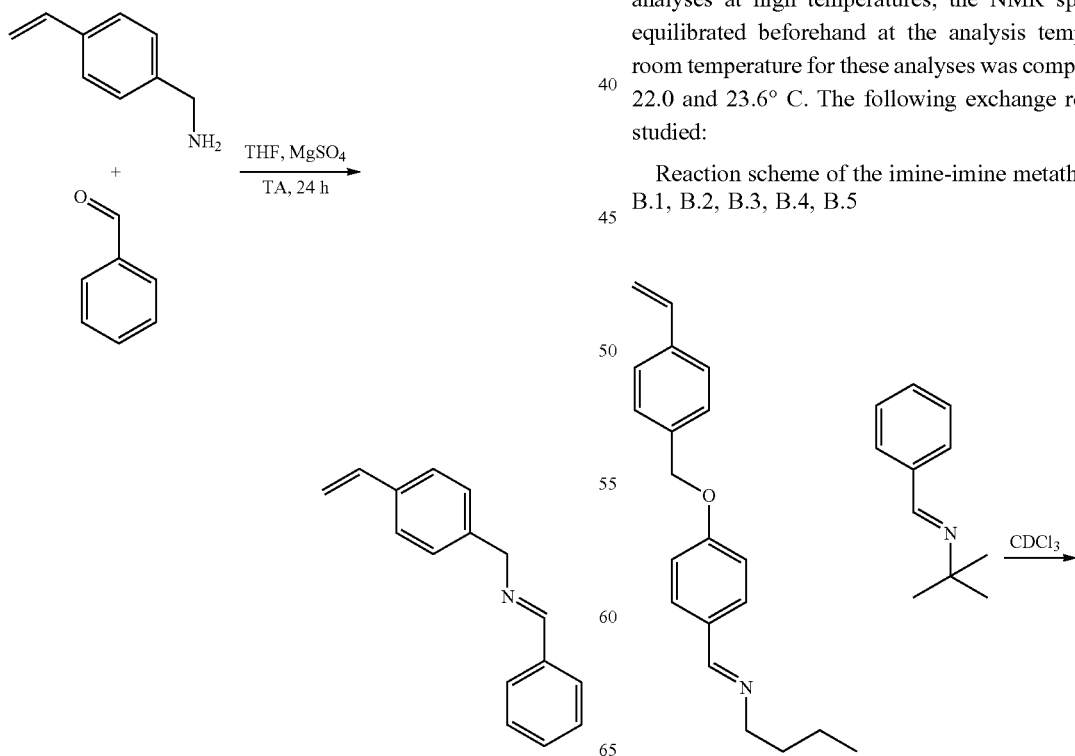

41
-continued

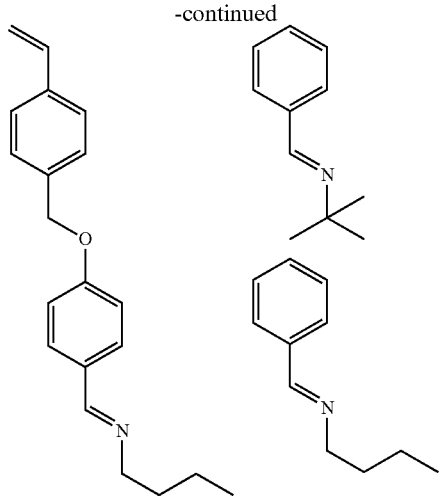

B.1. Non-catalysed imine-imine metathesis at room temperature (AT)

B.2. Non-catalysed imine-imine metathesis at 45° C.

B.3. Imine-imine metathesis in the presence of 10 mol % of amine (butylamine) at AT B.4. Imine-imine metathesis in the presence of 10 mol % of aldehyde (benzaldehyde) at AT B.5. Imine-imine metathesis in the presence of 10 mol % of aldehyde (benzaldehyde) at 45° C.

42

B.6. Imine-aldehyde exchange reaction at AT

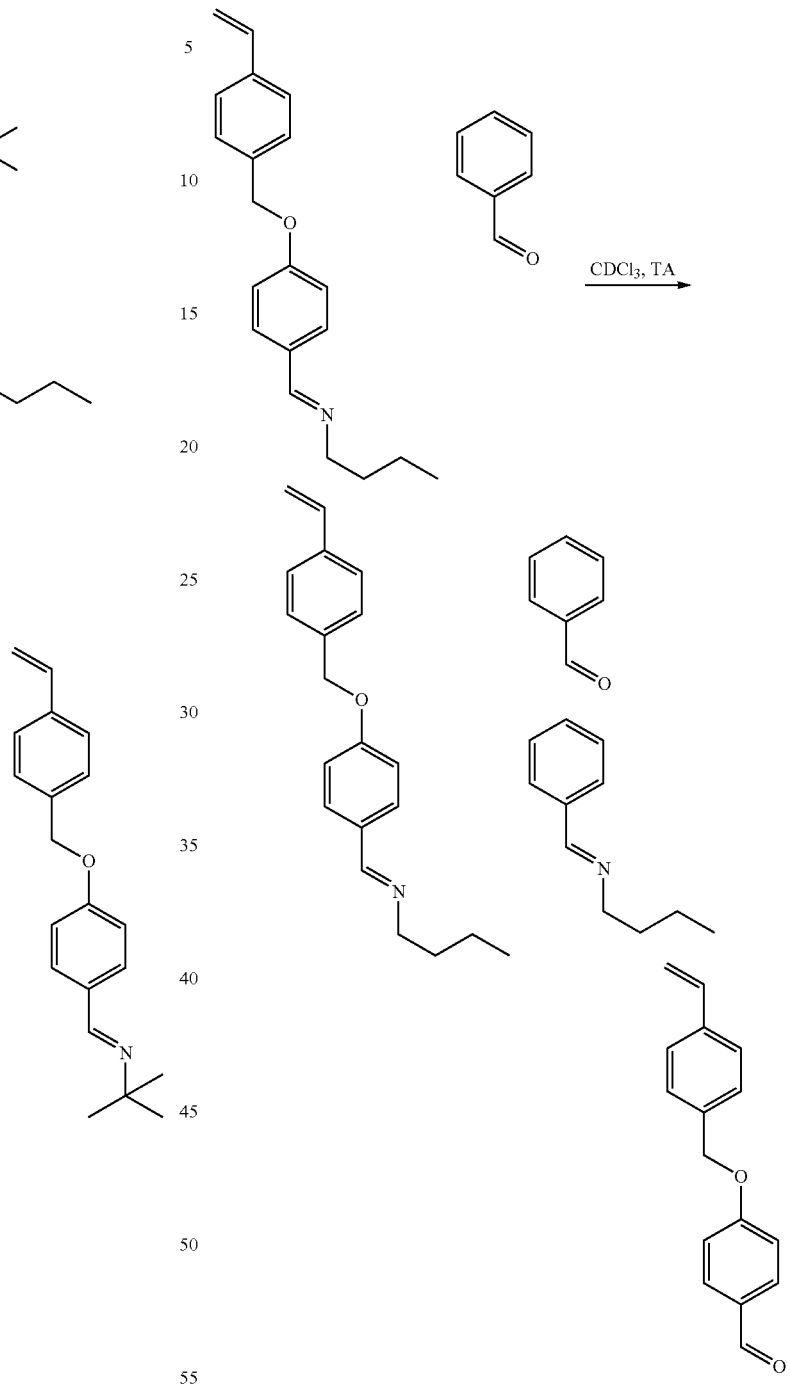

General Observations:

At thermodynamic equilibrium, each compound must represent 25 mol % of all of the products (in the case of non-catalysed reactions). The time required to form 15% of the two new compounds derived from metathesis or exchange reactions of the six reactions studied are presented in the table below. This arbitrary conversion threshold, which corresponds to a conversion of 60% compared to thermodynamic equilibrium, has been chosen in order to be able to compare the different exchange rates.

TABLE 1

| Reaction: | 1 | 2 | 3 | 4 | 5 | 6 |
|---|---|---|---|---|---|---|
| time [h] to form 15% of N-n-butylbenzimine | 32.5 | 23 | 7.5 | 4.75 | 0.75 | 8.75 |
| time [h] to form 15% of N-tert-butylimine monomer | 32.5 | 23 | 12.5 | 4.75 | 0.75 | 8.75 |

The non-catalysed imine-imine metathesis is the slowest exchange reaction among the slower reactions studied. The addition of free aldehyde during imine-imine metathesis makes it possible to substantially accelerate the reaction, practically by a factor 7 at AT and a factor 30 at 45° C. To our knowledge, the use of aldehyde to catalyse the metathesis of imines has not yet been described.

The imine-aldehyde exchange reaction also proved to be more rapid than the non-catalysed imine-imine metathesis reaction, by a factor of around 3.5.

C. Polymers P1

C.1. Polymer P1 Bearing Primary Amine Functional Groups: AMS-163

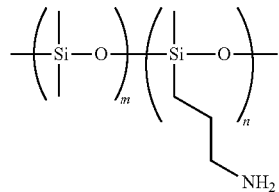

The siloxane copolymer bearing primary amine functions used in the following examples was purchased from the Gelest Company (CAS 99363-37-8). The characteristics of the grade AMS-163 are: Mn=50000 g/mol, 6-7 mol % of aminopropylsiloxane units, i.e. around 42 amine functions per polymer chain on average.

C.2. Exemplary Operating Procedure for the Synthesis of a Polymer P1 Bearing Imine Functional Groups Bound by the Nitrogen Atom: AMS-163Benz

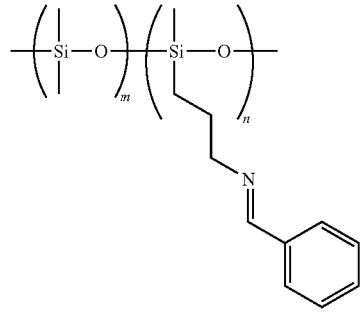

10 g of AMS-163 are solubilised in 10 mL of anhydrous THF. After total dissolution, 0.91 g of benzaldehyde (1.05 equivalents/to the amine functions) and 3 g of anhydrous magnesium sulphate (3 eq./to the amine functions) are added. The solution is stirred with a magnetic stirrer at room temperature for 12 h. After stopping the stirring, the mixture (suspension of magnesium sulphate) is left to settle for 24 h, then centrifuged at 9000 rpm for 30 minutes. The supernatant is evaporated and AMS-163Benz is recovered in the form of a slightly viscous transparent liquid. $^1$H NMR analysis in anhydrous $CDCl_3$ (15 mg of polymer/0.7 mL $CDCl_3$) shows that the conversion of the pendant primary amine functions into pendant imine functions is total: the signal of the alpha methylene protons of the amine function ($\delta$=2.6 ppm) has disappeared. A new signal has appeared at 3.5 ppm for the alpha methylene protons of the imine function formed, and the signal of the imine proton at 8.3 ppm.

D. Formation and Characterisation of Networks of Cross-linked Polymers containing Exchangeable Pendant Bonds that are Exchangeable by Aldehyde-Imine Exchange Reactions and/or by Iimine-Imine Exchange Reactions and/or by Imine-Primary Amine Exchange Reactions.

D.1. Networks of crosslinked polymers containing pendant bonds and exchangeable crosslinking points that are exchangeable by imine-primary amine exchange reactions.

The following examples present examples of liquid formulation and illustrate the formation in solution of a network of crosslinked polymers according to the invention.

a/ 25.3 g of AMS-163 are solubilised in 10 g of anhydrous THF. 0.54 g (3 eq. per siloxane chain) of compound of formula (I) CF3 are dissolved in 2 g of anhydrous THE and added under stirring to the solution of AMS-163. After around 2 h, a network of crosslinked polymers is obtained.

b/ 25.3 g of AMS-163 are solubilised in 10 g of anhydrous THF. 0.9 g (5 eq. per siloxane chain) of compound of formula (I) CF3 are dissolved in 2 g of anhydrous THF and added under stirring to the solution of AMS-163. After around 2 h, a network of crosslinked polymers is obtained.

c/ 25.3 g of AMS-163 are solubilised in 10 g of anhydrous THF. 1.8 g (10 eq. per siloxane chain) of compound of formula (I) CF3 are dissolved in 2 g of anhydrous THF and added under stirring to the solution of AMS-163. After around 2 h, a network of crosslinked polymers is obtained.

The following examples present examples of solid formulation and illustrate the formation of networks of crosslinked polymers according to the invention as well as their shaping by compression.

d/ 25.3 g of AMS-163 are solubilised in 10 g of anhydrous THF. 0.54 g (3 eq. per siloxane chain) of compound of formula (I) CF3 are dissolved in 2 g of anhydrous THF and added under stirring to the solution of AMS-163. After around 2 h, a network of crosslinked polymers is obtained. The THF is evaporated under a vacuum jar for 4 h at 100° C. Drying is completed in a vacuum oven at 120° C. for 12 h to remove residual THF.

The dry network of crosslinked polymers is cut into pieces then shaped under heating press at 130° C. and 3 tonnes for 1 h.

e/ 25.3 g of AMS-163 are solubilised in 10 g of anhydrous THF. 0.9 g (5 eq. per siloxane chain) of compound of formula (I) CF3 are dissolved in 2 g of anhydrous THF and added under stirring to the solution of AMS-163. After around 2 h, a network of crosslinked polymers is obtained. The THF is evaporated under a vacuum jar for 4 h at 100° C. Drying is completed in a vacuum oven at 120° C. for 12 h to remove residual THE.

The dry network of crosslinked polymers is cut into pieces then shaped under heating press at 130° C. and 3 tonnes for 1 h.

D.2. Networks of Crosslinked Polymers containing Pendant Bonds and Exchangeable Crosslinking Points that are Exchangeable by Imine-Aldehyde Exchange Reactions.

The following examples present examples of liquid formulation and illustrate the formation in solution of a network of crosslinked polymers according to the invention.

a/ 29.4 g of AMS-163Benz are solubilised in 20.3 g of anhydrous THF. 0.22 g (3 eq. per siloxane chain) of terephthaldehyde are dissolved in 2 g of anhydrous THF and added under stirring to the solution of AMS-163Benz. After around 2 h, a network of crosslinked polymers is obtained.

b/ 24.2 g of AMS-163Benz are solubilised in 18 g of anhydrous THF. 0.31 g (5 eq. per siloxane chain) of terephthaldehyde are dissolved in 2 g of anhydrous THF and added under stirring to the solution of AMS-163Benz. After around 2 h, a network of crosslinked polymers is obtained.

The following examples present examples of solid formulation and illustrate the formation of networks of crosslinked polymers according to the invention, their shaping by compression and their insolubility in a good non-reactive solvent of the polymer constituting the network of crosslinked polymers.

c/ 29.4 g of AMS-163Benz are solubilised in 20.3 g of anhydrous THF. 0.22 g (3 eq. per siloxane chain) of terephthaldehyde are dissolved in 2 g of anhydrous THF and added under stirring to the solution of AMS-163Benz. After around 2 h, a network of crosslinked polymers is obtained. The THF is evaporated under a vacuum jar for 4 h at 100° C. The drying is completed in a vacuum oven at 120° C. for 12 h to remove residual THF.

The dry network of crosslinked polymers is cut into pieces then shaped under heating press at 130° C. and 3 tonnes for 1 h.

Solubility test at room temperature in anhydrous THF

A sample (139 mg) of the network of crosslinked polymers thereby obtained is introduced into 10 mL of anhydrous THF and left to swell for 24 hours at room temperature. The swelling rate (SR) and the soluble fraction (SF) of the network of crosslinked polymers are next calculated.

Swelling rate=(Mass of the swollen sample−Mass of the dry sample after swelling)/(Mass of the dry sample after swelling)

Soluble fraction=(Mass of the dry sample before swelling−Mass of the dry sample after swelling)/(Mass of the dry sample before swelling)

Insoluble fraction=100−soluble fraction

Results: swelling rate SR=15.4; soluble fraction SF=29.6%; insoluble fraction=70.4% d/ 24.2 g of AMS-163Benz are solubilised in 18 g of anhydrous THF. 0.31 g (5 eq. per siloxane chain) of terephthaldehyde are dissolved in 2 g of anhydrous THF and added under stirring to the solution of AMS-163Benz. After around 2 h, a network of crosslinked polymers is obtained. The THF is evaporated under a vacuum jar for 4 h at 100° C. The drying is completed in a vacuum oven at 120° C. for 12 h to remove residual THF.

The dry network of crosslinked polymers is cut into pieces then shaped under heating press at 130° C. and 3 tonnes for 1 h.

Solubility test at room temperature in anhydrous THF

A sample (130 mg) of the network of crosslinked polymers thereby obtained is introduced into 10 mL of anhydrous THF and left to swell for 16 hours at room temperature. The swelling rate (SR) and the soluble fraction (SF) of the network of crosslinked polymers are next calculated. Results: swelling rate SR=6.21; soluble fraction SF=13.9%; insoluble fraction=86.1%.

D.3. Networks of Crosslinked Polymers containing Pendant Bonds and Exchangeable Crosslinking Points that are Exchangeable by Imine-Imine Exchange Reactions.

The following examples present examples of liquid formulation and illustrate the formation in solution of a network of crosslinked polymers according to the invention.

a/ 22.3 g of AMS-163Benz are solubilised in 18 g of anhydrous THF. 0.445 g (3 eq. per siloxane chain) of compound of formula (I) CF3 are dissolved in 4 g of anhydrous THF and added under stirring to the solution of AMS-163Benz. After around 2 h, a network of crosslinked polymers is obtained.

b/ 22 g of AMS-163Benz are solubilised in 18 g of anhydrous THF. 0.733 g (5 eq. per siloxane chain) of compound of formula (I) CF3 are dissolved in 4 g of anhydrous THF and added under stirring to the solution of AMS-163Benz. After around 2 h, a network of crosslinked polymers is obtained.

The following examples present examples of solid formulation and illustrate the formation of networks of crosslinked polymers according to the invention, their shaping by compression and their insolubility in a good non-reactive solvent of the polymer constituting the network of crosslinked polymers.

c/ 22.3 g of AMS-163Benz are solubilised in 18 g of anhydrous THF. 0.445 g (3 eq. per siloxane chain) of compound of formula (I) CF3 are dissolved in 4 g of anhydrous THF and added under stirring to the solution of AMS-163Benz. After around 2 h, a network of crosslinked polymers is obtained. The THF is evaporated under a vacuum jar for 4 h at 100° C. The drying is completed in a vacuum oven at 120° C. for 12 h to remove residual THF.

The dry network of crosslinked polymers is cut into pieces then shaped under heating press at 130° C. and 3 tonnes for 1 h.

Solubility test at room temperature in anhydrous THF

A sample (120 mg) of the network of crosslinked polymers thereby obtained is introduced into 10 mL of anhydrous THF and left to swell for 24 hours at room temperature. The swelling rate (SR) and the soluble fraction (SF) of the network of crosslinked polymers are next calculated. Results: swelling rate SR=23.6; soluble fraction SF=32%; insoluble fraction=68% d/ 22 g of AMS-163Benz are solubilised in 18 g of anhydrous THF. 0.733 g (5 eq. per siloxane chain) of compound of formula (I) CF3 are dissolved in 4 g of anhydrous THF and added under stirring to the solution of AMS-163Benz. After around 2 h, a network of crosslinked polymers is obtained. The THF is evaporated under a vacuum jar for 4 h at 100° C. The drying is completed in a vacuum oven at 120° C. for 12 h to remove residual THF.

The dry network of crosslinked polymers is cut into pieces then shaped under heating press at 130° C. and 3 tonnes for 1 h.

Solubility test at room temperature in anhydrous THF

A sample (144 mg) of the network of crosslinked polymers thereby obtained is introduced into 10 mL of anhydrous THE and left to swell for 24 hours at room temperature. The swelling rate (SR) and the soluble fraction (SF) of the network of crosslinked polymers are next calculated. Results: swelling rate SR=6.47; soluble fraction SF=11.2%; insoluble fraction=88.8%.

The invention claimed is:

1. A silicone composition comprising (a) crosslinked polymers comprising consecutive —Si—O— units containing exchangeable pendant bonds and exchangeable crosslinking points, that are exchangeable by aldehyde-imine exchange reactions and/or by imine-imine exchange reactions and/or by imine-primary amine exchange reactions, obtained by crosslinking of linear or branched polymers comprising consecutive —Si—O— units and (b) monofunctional free aldehydes and/or monofunctional free imines and/or monofunctional free primary amines.

2. The composition according to claim 1, wherein said composition comprises aldehydes and wherein at least 1 mol % of the aldehyde functions are aromatic aldehyde functions.

3. The composition according to claim 1, wherein the crosslinked polymers, before crosslinking, are linear or branched polymers having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom.

4. The composition according to claim 1, wherein said composition results from mixing, in the molten state or in solution, of:
at least one linear or branched silicone polymer, comprising consecutive —Si—O— units P1 having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom; and
at least one additive bearing at least two imine and/or aldehyde and/or primary amine functional groups able to react with the side groups of the silicone polymer P1 to form a composition of crosslinked polymers with exchangeable bonds and exchangeable crosslinking points that are exchangeable by aldehyde-imine exchange reactions or by imine-imine exchange reactions or by imine-primary amine exchange reactions;
optionally, monofunctional free aldehydes.

5. The composition according to claim 4, wherein the additive is a compound of formula (I) or of formula (II) or a mixture of these compounds, the formulas (I) and (II) meeting the following definitions:

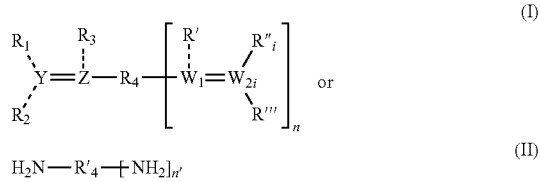

in which:
n, n' is an integer varying from 1 to 6;
i is an integer varying from 1 to n;
the bonds in dashed lines are present or absent, as a function of the valency of Y, Z, $W_1$, $W_{2i}$;
Y and Z are different and each represents either C or N, or Y is O and then Z is C:
when Y represents C, then Z represents N, and $R_1$ represents a hydrocarbon group, $R_2$ represents H and $R_3$ is absent,
when Y represents N, then Z represents C, and $R_1$ represents H or a hydrocarbon group, $R_2$ is absent and $R_3$ represents H,
when Y is O, then Z is C and, $R_1$, $R_2$ are absent and $R_3$ represents H;
$R_4$ and $R'_4$ represent a hydrocarbon group bound to the amine and/or imine and/or aldehyde functional groups by a covalent bond via a carbon atom;
in each block $W_1(R')=W_{2i}(R''_i)(R''')$:
$W_1$ and $W_{2i}$ are different and each represents either C or N, or $W_{2i}$ is O and then $W_1$ is C:
when $W_{2i}$ represents C, then $W_1$ represents N and R' is absent, $R''_i$ represents a hydrocarbon group and R''' represents H,
when $W_{2i}$ represents N, then $W_1$ represents C and R' represents H, $R''_i$ represents H or a hydrocarbon group, and R''' is absent,
when $W_{2i}$ is O, then $W_1$ is C and $R''_i$, R''' are absent and R' represents H;
when Z represents C, then $W_1$ represents C,
when Y represents C, then $W_{2i}$ represents C; and
when the additive is a mixture of compounds of formula (I) and of formula (II) then the compound of formula (I) Z represents N and $W_1$ represents N.

6. The composition according to claim 5, wherein:
the silicone polymer P1 has side groups bearing imine functional groups bound to the main chain by their carbon atoms and the additive is selected from: a silicone polymer P2 of which the side groups bear imine functional groups bound to the main chain by their nitrogen atoms, a silicone polymer P2 of which the side groups bear primary amine functional groups, a silicone polymer P2 comprising side groups bearing primary amine functional groups and side groups bearing imine functional groups bound to the main chain by their nitrogen atoms, a compound of formula (I) in which the atoms Z and $W_1$ represent N, a compound of formula (II), a mixture of compounds of formula (II) and of formula (I) in which the atoms Z and $W_1$ represent N, or a mixture of these additives;
the silicone polymer P1 has side groups bearing imine functional groups bound to the main chain by their nitrogen atoms and the additive is selected from: a silicone polymer P2 of which the side groups bear imine functional groups bound to the main chain by their carbon atoms, a silicone polymer P2 of which the side groups bear aldehyde functional groups, a silicone polymer P2 comprising side groups bearing aldehyde functional groups and side groups bearing imine functional groups bound to the polymer by the carbon atom, a compound of formula (I) in which the atoms Z and W1 represent C or a mixture of these additives;
the silicone polymer P1 has side groups bearing aldehyde functional groups and the additive is selected from: a silicone polymer P2 having side groups bearing imine functional groups bound to the main chain by their nitrogen atoms, a silicone polymer P2 comprising side groups bearing primary amine functional groups and side groups bearing imine functional groups bound to the polymer by the nitrogen atom, a compound of formula (I) in which the atoms Z and W1 represent N or a mixture of these additives;

the silicone polymer P1 has side groups bearing primary amine functional groups and the additive is a silicone polymer P2 comprising side groups bearing imine functional groups bound to the polymer by the carbon atom, a silicone polymer P2 comprising side groups bearing aldehyde functional groups and side groups bearing imine functional groups bound to the polymer by the carbon atom, a compound of formula (I) in which the atoms Z and W1 represent C and, Y and one W2i at least represents N, the other W2i represents, each independently of each other, N or O where appropriate or a mixture of these additives;

the silicone polymer P1 has side groups bearing aldehyde functional groups and side groups bearing imine functional groups bound to the main chain by their carbon atoms and the additive is a silicone polymer P2 comprising side groups bearing primary amine functional groups, a silicone polymer P2 comprising side groups bearing imine functional groups bound to the polymer by the nitrogen atom, a silicone polymer P2 comprising side groups bearing primary amine functional groups and side groups bearing imine functional groups bound to the polymer by the nitrogen atom, a compound of formula (I) in which the atoms Z and W1 represent N, a compound of formula (II), a mixture of compounds of formula (II) and of formula (I) in which the atoms Z and W1 represent N or a mixture of these additives; or the silicone polymer P1 has side groups bearing primary amine functional groups and side groups bearing imine functional groups bound to the main chain by their nitrogen atoms and the additive is a silicone polymer P2 comprising side groups bearing aldehyde functional groups, a silicone polymer P2 comprising side groups bearing imine functional groups bound to the polymer by the carbon atom, a silicone polymer P2 comprising side groups bearing aldehyde functional groups and side groups bearing imine functional groups bound to the polymer by the carbon atom, a compound of formula (I) in which the atoms Z and W1 represent C or a mixture of these additives.

7. Combinations for crosslinking linear or branched silicone polymers, comprising consecutive —Si—O— units, said combinations being selected from combinations comprising:

a monofunctional free aldehyde+compound of formula (I), as defined in claim 5;
compound of formula (II)+compound of formula (I) in which Z represents N and W1 represents N, as defined in claim 5;
A and/or B+compound of formula (I) for which Z and W1 are N, and optionally a monofunctional free aldehyde, as defined in claim 5;
A, optionally B, +compound of formula (II) and optionally a monofunctional free aldehyde, as defined in claim 5; or
C and/or E+compound of formula (I) for which Z and W1 are C, and optionally a monofunctional free aldehyde, as defined in claim 5;
A, B, C, D, E meeting the following formulas: (A) $G_1$-Rx-CH=N-Ry, (B) $G_2$-R'x-CH=O, (C) $G_3$-R''y-N=CH—R''x and (E) $G_6$-Rw-NH$_2$, where the letters $G_1$, $G_2$, $G_3$, and $G_6$ represent a functional group making it possible to bond in a covalent manner the molecules to the polymer chains to functionalise, Rx, R'x, R''x and Ry, R''y, Rw are hydrocarbon groups.

8. A method for forming a composition comprising crosslinked polymers containing exchangeable pendant bonds and exchangeable crosslinking points that are exchangeable by aldehyde-imine exchange reactions and/or by imine-imine exchange reactions and/or by imine-primary amine exchange reactions; and monofunctional free aldehydes and/or monofunctional free imines and/or monofunctional free primary amines, comprising using a combination as defined in claim 7, in the presence of a linear or branched silicone polymer, comprising consecutive —Si—O— units P1 or P1', wherein:

the consecutive —Si—O— units P1 have side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom; and
the consecutive —Si—O— units P1' comprise functional groups enabling grafting.

9. The method according to claim 8, further comprising modifying a rheology of the composition by including an oil, a paint or a cosmetic formulation therein.

10. The composition according to claim 4, wherein the additive is a linear or branched silicone polymer P2, comprising consecutive —Si—O— units, having side groups bearing:
aldehyde functional groups, or
imine functional groups bound to the polymer by the carbon atom, or
imine functional groups bound to the polymer by the nitrogen atom, or
aldehyde functional groups and imine functional groups bound to the polymer by the carbon atom, or
primary amine functional groups, or
primary amine functional groups and imine functional groups bound to the polymer by the nitrogen atom.

11. Combinations for crosslinking linear or branched silicone polymers, comprising consecutive —Si—O— units, said combinations comprising
a monofunctional free aldehyde+silicone polymer P2, as defined in claim 10.

12. A method for forming a composition comprising crosslinked polymers containing exchangeable pendant bonds and exchangeable crosslinking points that are exchangeable by aldehyde-imine exchange reactions and/or by imine-imine exchange reactions and/or by imine-primary amine exchange reactions; and monofunctional free aldehydes and/or monofunctional free imines and/or monofunctional free primary amines, comprising using a combination as defined in claim 11, in the presence of a linear or branched silicone polymer, comprising consecutive —Si—O— units P1 or P1', wherein:

the consecutive —Si—O— units P1 have side groups bearing:
aldehyde functional groups, or
imine functional groups bound to the polymer by the carbon atom, or
imine functional groups bound to the polymer by the nitrogen atom, or aldehyde functional groups and imine functional groups bound to the polymer by the carbon atom, or primary amine functional groups, or primary amine functional groups and imine functional groups bound to the polymer by the nitrogen atom; and the consecutive —Si—O— units P1' comprise functional groups enabling grafting.

13. The method according to claim 12, further comprising modifying a rheology of the composition by including an oil, a paint or a cosmetic formulation therein.

14. A method for forming a composition comprising crosslinked silicone polymers, comprising consecutive —Si—O— units containing exchangeable pendant bonds and exchangeable crosslinking points that are exchangeable by aldehyde-imine exchange reactions and/or by imine-imine exchange reactions and/or by imine-primary amine exchange reactions, monofunctional free aldehydes and/or monofunctional free imines and/or monofunctional free primary amines comprising using an additive as defined in claim 4 in the presence of a linear or branched silicone polymer, the linear or branched silicone polymer comprising the consecutive —Si—O— units P1 as defined in claim 4 or consecutive —Si—O— units P1' comprising functional groups enabling grafting.

15. The composition according to claim 1, wherein said composition results from mixing, in the molten state or in solution, of:

at least one linear or branched silicone polymer P1', comprising consecutive —Si—O— units, and comprising functional groups enabling grafting; and a combination of molecules including molecules comprising at one end a functional group making it possible to bond in a covalent manner the molecule to the polymer P1' and at the other end a functional group selected from an imine function bound to the molecule by its carbon atom, an imine function bound to the molecule by its nitrogen atom, an aldehyde function or a primary amine function, and/or molecules comprising at two of their ends functional groups making it possible to bond in a covalent manner the molecule to the polymer P1' and between its two ends an imine function, the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions;

optionally, monofunctional free aldehydes.

16. The composition according to claim 1, wherein the aldehyde is a molecule for which the aldehyde function is borne by an aryl, heteroaryl group or the alkene function of a terpenoid.

17. A method for catalysing the imine-imine metathesis reactions and imine-aldehyde exchange reactions carried out in the compositions defined in claim 1, which comprises using aldehyde.

18. A material obtained from the composition according to claim 1.

19. A formulation comprising the composition according to claim 1.

20. Combinations for crosslinking linear or branched silicone polymers, comprising consecutive —Si—O— units said combinations being selected from combinations comprising:

A and/or B+C, and optionally a monofunctional free aldehyde as defined in claim 1;

A, optionally B, +C and/or E, and optionally a monofunctional free aldehyde as defined in claim 1; or A and/or B and/or C+D and/or E, and optionally a monofunctional free aldehyde as defined in claim 1;

A, B, C, D, E meeting the following formulas: (A) $G_1$-Rx-CH=N-Ry, (B) CH=O, (C) $G_3$-R''y-N=CH—R''x, (D) $G_4$-R'''x-CH=N—R'''y-$G_5$ and (E) $G_6$-Rw-NH$_2$, where the letters $G_1$, $G_2$, $G_3$, $G_4$, $G_5$ and $G_6$ represent a functional group making it possible to bond in a covalent manner the molecules to the polymer chains to functionalise, Rx, R'x, R''x, R'''x and Ry, R''y, R'''y, Rw are hydrocarbon groups.

21. A method for forming a composition comprising crosslinked polymers containing exchangeable pendant bonds and exchangeable crosslinking points that are exchangeable by aldehyde-imine exchange reactions and/or by imine-imine exchange reactions and/or by imine-primary amine exchange reactions; and monofunctional free aldehydes and/or monofunctional free imines and/or monofunctional free primary amines, comprising using a combination as defined in claim 20, in the presence of a linear or branched silicone polymer, comprising consecutive —Si—O— units P1 or P1', wherein:

the consecutive —Si—O— units P1 have side groups bearing:

aldehyde functional groups, or imine functional groups bound to the polymer by the carbon atom, or imine functional groups bound to the polymer by the nitrogen atom, or aldehyde functional groups and imine functional groups bound to the polymer by the carbon atom, or primary amine functional groups, or primary amine functional groups and imine functional groups bound to the polymer by the nitrogen atom; and the consecutive —Si—O— units P1' comprise functional groups enabling grafting.

22. A method according to claim 21, further comprising modifying a rheology of the composition by including an oil, a paint or a cosmetic formulation therein.

23. A method for preparing a composition of crosslinked silicone polymers, comprising consecutive —Si—O— units, said method comprising:

choosing a linear or branched silicone polymer, comprising consecutive —Si—O— units P1 having side groups bearing:

aldehyde functional groups, or imine functional groups bound to the polymer by the carbon atom, or imine functional groups bound to the polymer by the nitrogen atom, or aldehyde functional groups and imine functional groups bound to the polymer by the carbon atom, or primary amine functional groups, or primary amine functional groups and imine functional groups bound to the polymer by the nitrogen atom;

choosing at least one additive bearing at least two imine and/or aldehyde and/or primary amine functional groups able to react with the side groups of the polymer P1 to form a composition of crosslinked polymers containing exchangeable pendant bonds and exchangeable crosslinking points that are exchangeable by aldehyde-imine exchange reactions and/or by imine-imine exchange reactions and/or by imine-primary amine exchange reactions; and mixing, in the molten state or in solution, said polymer P1, said additive and, optionally a monofunctional free aldehyde to obtain said composition.

24. A method for preparing a composition of crosslinked polymers, said method comprising the following steps:

choosing a linear or branched silicone polymer, comprising consecutive Si—O— units P1' comprising functional groups enabling grafting;

choosing a combination of molecules including molecules comprising at one end a functional group making it possible to bond in a covalent manner the molecule to the polymer P1' and at the other end a functional group selected from an imine function bound to the molecule by its carbon atom, an imine function bound to the molecule by its nitrogen atom, an aldehyde function, or a primary amine function and/or molecules comprising at two of their ends functional groups making it possible to bond in a covalent manner the molecule to the polymer P1' and between these two ends an imine function, the combination having to enable the grafting and the creation of exchangeable pendant bonds and exchangeable crosslinking points that are exchangeable by aldehyde-imine exchange reactions and/or by imine-imine exchange reactions and/or by imine-primary amine exchange reactions; and mixing, in the molten state or in solution, said polymer P1', said combination and optionally a monofunctional free aldehyde, to obtain said composition.

\* \* \* \* \*